US005585926A

United States Patent [19]
Fujii et al.

[11] Patent Number: 5,585,926
[45] Date of Patent: Dec. 17, 1996

[54] DOCUMENT READING APPARATUS CAPABLE OF RECTIFYING A PICKED UP IMAGE DATA OF DOCUMENTS

[75] Inventors: Shinichi Fujii, Amagasaki; Shinya Matsuda, Kyoto; Noriyuki Okisu, Sakai; Satoshi Nakamura, Amagasaki; Toshihiko Karasaki, Kawachinagano, all of Japan

[73] Assignee: Minolta Co., Ltd., Osaka, Japan

[21] Appl. No.: 987,364

[22] Filed: Dec. 7, 1992

[30] Foreign Application Priority Data

Dec. 5, 1991 [JP] Japan .................................. 3-349164
Dec. 5, 1991 [JP] Japan .................................. 3-349165
Dec. 5, 1991 [JP] Japan .................................. 3-349166
Dec. 5, 1991 [JP] Japan .................................. 3-349167
Dec. 5, 1991 [JP] Japan .................................. 3-349168

[51] Int. Cl.⁶ .................................................. H04N 1/40
[52] U.S. Cl. .......................... 358/471; 358/474; 358/488; 358/479; 355/52; 355/55; 355/47
[58] Field of Search .................................. 358/479, 471, 358/474, 475, 401, 488, 497, 358; 250/208.1, 200.1; 355/45, 25, 55, 52, 47, 82, 243

[56] References Cited

U.S. PATENT DOCUMENTS

| | | | |
|---|---|---|---|
| 4,980,720 | 12/1990 | Siegel | 355/25 |
| 5,003,167 | 3/1991 | Arques | 250/208.1 |
| 5,119,444 | 6/1992 | Nishihara | 382/45 |
| 5,140,236 | 8/1992 | Kawamura | 318/568.1 |
| 5,194,729 | 3/1993 | Okisu | 250/561 |
| 5,276,530 | 1/1994 | Siegel . | |
| 5,280,546 | 1/1994 | Machida et al. | 358/451 |

FOREIGN PATENT DOCUMENTS 60-254869  12/1985  Japan .

Primary Examiner—Edward L. Coles, Sr.
Assistant Examiner—Madeleine Nguyen

[57] ABSTRACT

In a document reading apparatus capable of picking up image data of documents from above position thereof, curvature of the documents is detected by measuring the height of the document surface. In accordance with the detected curvature, interpolative and expansional processing to the picked up image data is executed. Distorted image data of the documents due to the curvature is thereby corrected.

16 Claims, 32 Drawing Sheets

FIG. 12
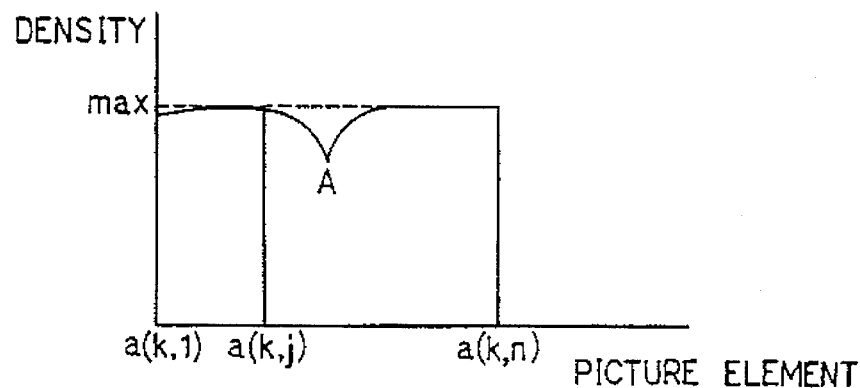
FIG. 13
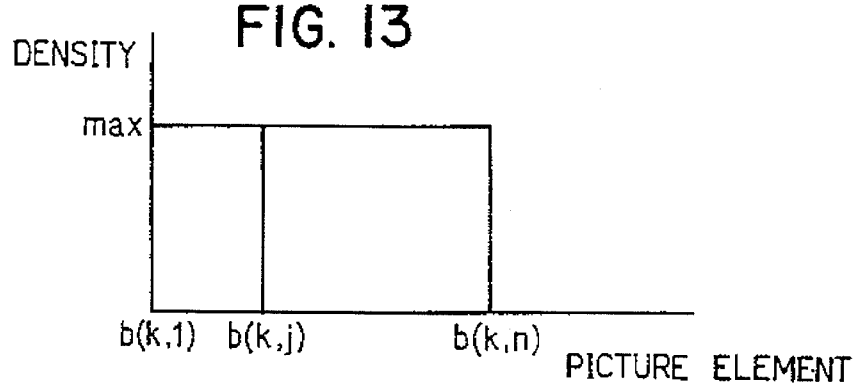
FIG. 14
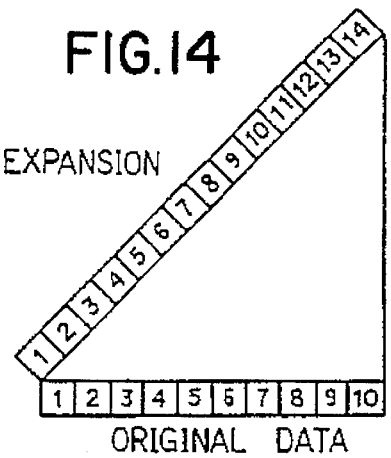
DATA AFTER EXPANSION
ORIGINAL DATA
FIG. 15
| PICTURE ELEMENT NO. AFTER EXPANSION | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| ORIGINAL DATA NO. APPLIED AFTER EXPANSION | 1 | 2 | 2 | 3 | 4 | 4 | 5 | 6 | 7 | 7 | 8 | 9 | 9 | 10 |

BEFORE EXPANSION

AFTER EXPANSION

FIG. 32
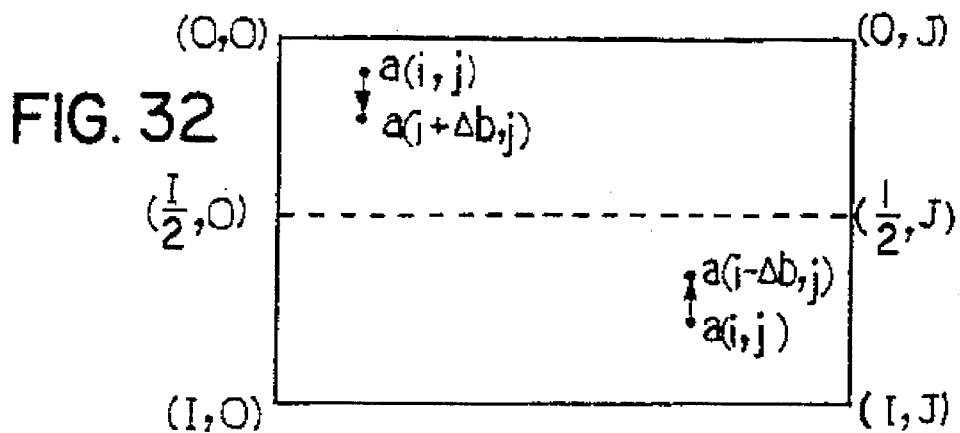
FIG. 33
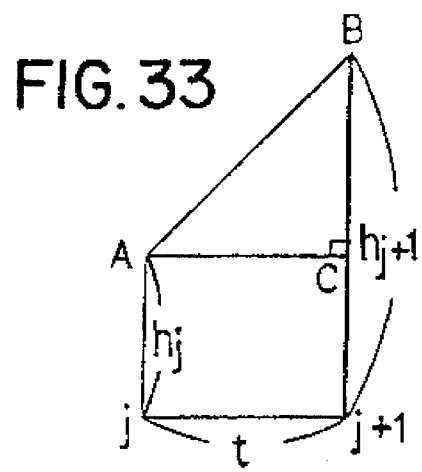
FIG. 34a
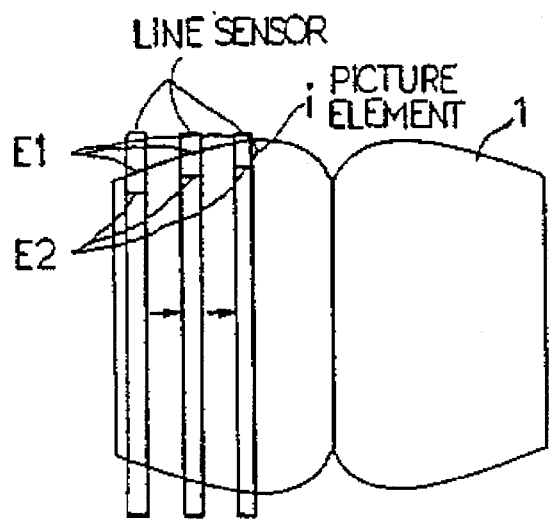
FIG. 34.b
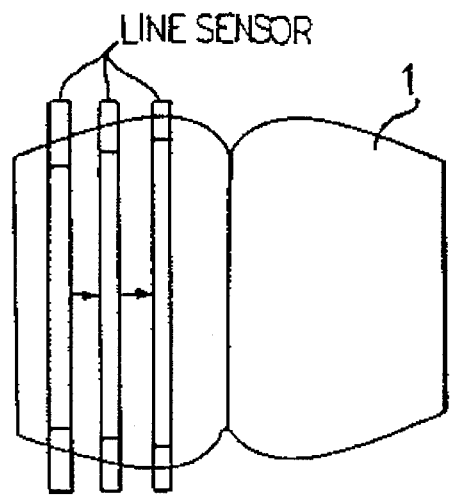

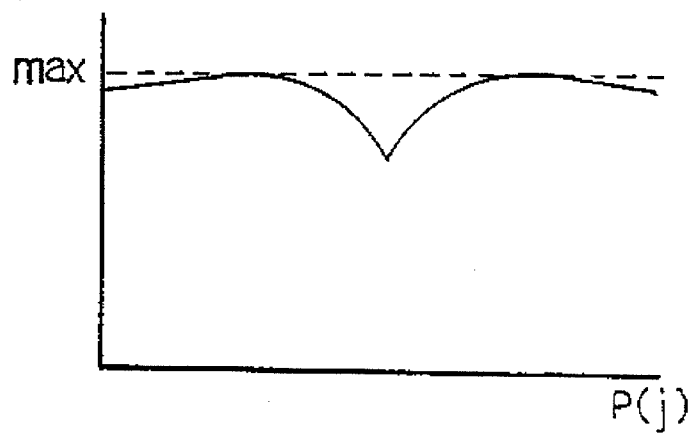
FIG. 35
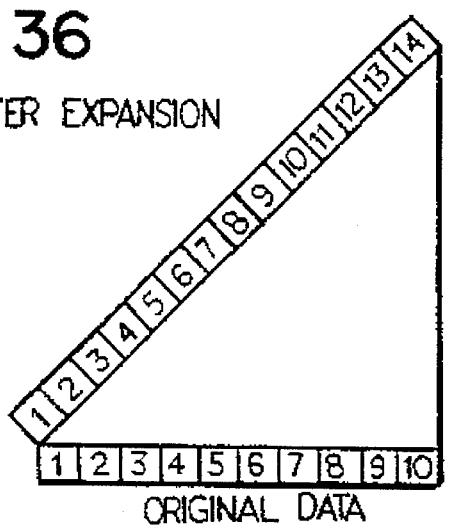
FIG. 36
FIG. 37
| PICTURE ELEMENT NO. AFTER EXPANSION | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| ORIGNAL DATA NO. APPLIED AFTER EXPANSION | 1 | 2 | 2 | 3 | 4 | 4 | 5 | 6 | 7 | 7 | 8 | 9 | 9 | 10 |

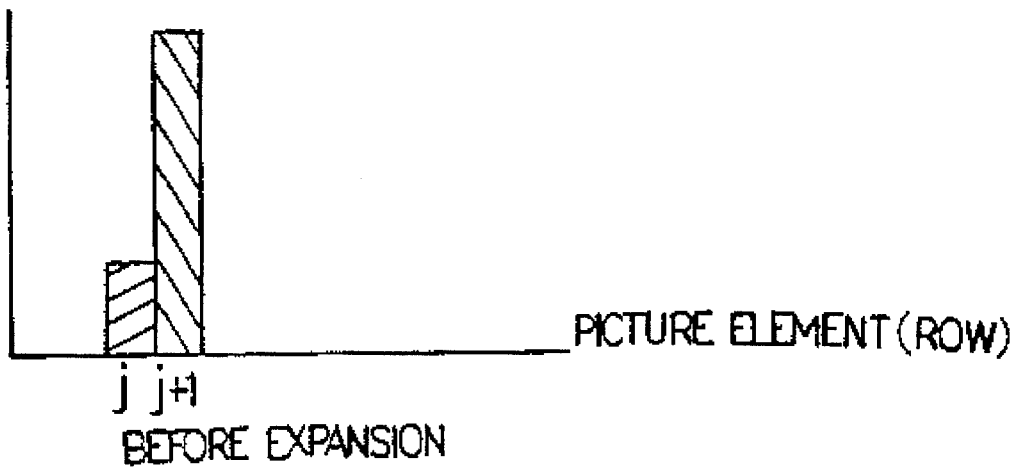
FIG. 38a BEFORE EXPANSION
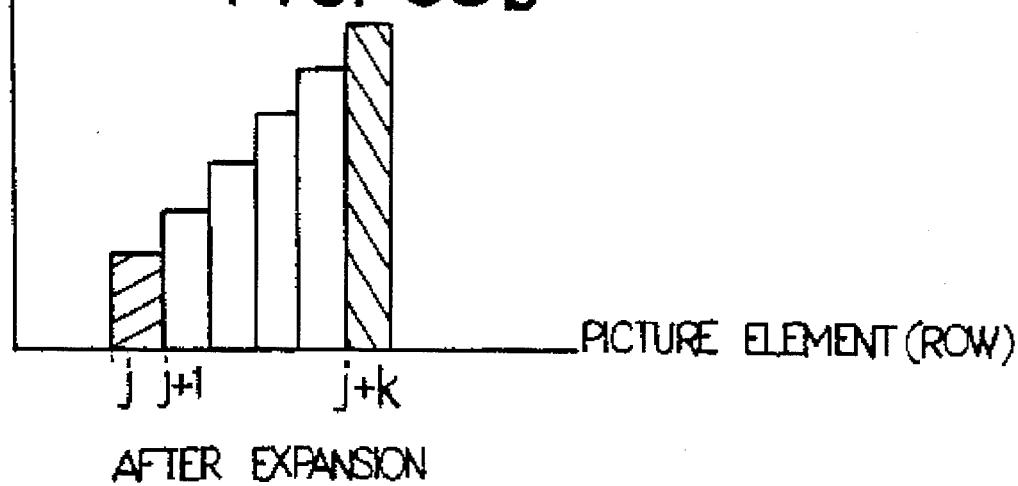
FIG. 38b AFTER EXPANSION

DOCUMENT READING APPARATUS
CAPABLE OF RECTIFYING A PICKED UP
IMAGE DATA OF DOCUMENTS

BACKGROUND OF THE INVENTION

The present invention relates to a document reading apparatus for imaging a document from above, and capable of detecting and rectifying curvatures of a document surface.

In case of imaging a document from above, an image of a document whose document surface is flat can be picked up exactly. However, in case of imaging a document bound in book form from above, a picked up image is distorted and compressed in regions adjacent to a joint, since document surface is curved along the joint. As a countermeasure to this inconvenience, it is conventionally known a document reading apparatus for imaging a document with use of a line sensor and the like, which employs a distance sensor for measuring a distance from the document and changes a reading pitch in the direction of sub scanning in accordance with measured value (e.g., Japanese Laid-Open Patent Publication No. 62-143557). Also, it is known an apparatus which illuminates a document surface with a line beam, measures a shape of the document, namely, how the document surface is curved, by making use of an image of the reflected light and rectifies the data by effecting an expansional processing with an image data in accordance with the measured shape (e.g., U.S. Pat. No. 5,084,611)

However, in the former apparatus, it is difficult to construct a mechanical arrangement so as to change a reading pitch in sub scanning direction, resulting in a complicated construction. Further, production costs has to become high because of the adoption of a distance sensor.

Meanwhile, in the latter apparatus, an interpolation of distance measurement data and the like is not carried out, and then it often occurs that a shape measurement is not performed precisely. Accordingly, it is impossible to rectify the image data accurately. Also, because a density reproducing interpolative processing is not performed at the time of expansional processing of a picked up image, it often occurs that an image is not reproduced clearly in the regions adjacent to a joint in a document whose image must be expanded at a large ratio. Also, it is impossible to rectify the distortion in the direction of line, caused by the displacement in the direction of row of the picked up image owing to the difference of height over the document surface.

SUMMARY OF THE INVENTION

It is therefore a general object of the present invention to provide a document reading apparatus which can expand an image data compressed owing to curvatures of a document and reproduce an image accurately as if the document was flat, in case of imaging a document from above, by detecting three-dimensional curvatures of a document surface and rectifying image data at the time of reproduction, without complicated mechanical arrangement of scanning as in conventional apparatus.

The above object is fulfilled, according to the present invention, by a document reading apparatus comprising document reading means for reading a document; measuring means for measuring height of plural points on the document surface; interpolative means for interpolating a measured value obtained from the measuring means based on a plurality of measured value; and rectifying means for rectifying an output from the document reading means in response to an output from the interpolative means.

It is another object of the present invention to provide a document reading apparatus capable of image reproduction as if imaging a flat document by detecting at the time of document reading how document is curved and effecting a density reproducing interpolative processing in accordance with the result of the detection at the time of image expansional processing.

The above object is fulfilled, according to the present invention, by a document reading apparatus comprising document reading means for reading a document; imaging means provided in the document reading means and having a plurality of picture element for imaging the document; shape detecting means for detecting a shape of the document; calculating means for calculating an image expansion ratio for each picture element output in response to an output from the shape measuring means; and expanding means for performing a density reproducing interpolation in each picture element output and an image expansion in response to an output from the calculating means.

It is a still another object of the present invention to provide a document reading apparatus capable of rectifying a distortion in the direction of line (horizontal direction) of the document by detecting a displacement in the direction of row of the document and processing data electrically in accordance with the result of detection, and further capable of most appropriate rectification by rectifying the displacement in the row direction (vertical) electrically so as to rectify a distortion in the line direction (horizontal) and subsequently by effecting expansional rectification in the line direction (horizontal).

The above object is fulfilled, according to the present invention, by a document reading apparatus comprising document reading means for reading a document; shape detecting means for detecting a shape of the document; and distortion rectifying means for rectifying the distortion in the direction of line in an output from the document reading means in response to an output from the shape detecting means.

it is a further object of the present invention to provide a document reading apparatus capable of appropriate image reproduction by detecting a boundary portion between the document and a document holder at the time of document reading whereby detecting curvatures of a document surface and rectifying image data in accordance with result of the detection.

The above object is fulfilled, according to the present invention, by a document reading apparatus comprising a document holder on which a document is placed; document reading means disposed with a predetermined distance apart from the document holder for reading the document; boundary detecting means for detecting a boundary between the document and the document holder based on an output from the document reading means; shape detecting means for detecting a shape of document based on an output from the boundary detecting means; and rectifying means for rectifying an output from the document reading means in response to the output from the shape detecting means.

Also, the above object is fulfilled, according to the present invention, by a document reading apparatus comprising a document holder on which a document is placed; reading means for reading the document on the document holder and outputting an image data thereof; boundary detecting means for detecting a boundary between an image of the document and that of the document holder in an image data outputted from the reading means; varied magnification calculating means for calculating varied magnification based on a detecting output from the boundary detecting means; and rectifying means for rectifying distortion of the image of the document in the image data with use of the varied magnification calculated by the varied magnification calculating means.

These and further objects and feature of the invention will become apparent from the following detailed description of the preferred embodiments thereof taken in connection with the accompanying drawings.

BRIEF DESCRIPTION OF THE DRAWINGS

FIG. 12 is an explanatory view of density distribution before rectifying uneven brightness.

FIG. 13 is an explanatory view of density distribution after rectifying uneven brightness.

FIG. 14 is an explanatory view of an image expansional processing.

FIG. 15 is an explanatory view of an image expansional processing.

FIG. 31($b$) is a view showing result of imaging of the document, in case the document is flat.

FIG. 32 is an explanatory view of coordinate transformation.

FIG. 33 is an explanatory view of an equation of an image expansional ratio $\alpha$ (j).

FIGS. 34a and 34b are explanatory views of uneven brightness rectification.

FIG. 35 is a view showing brightness distribution.

FIG. 36 is an explanatory view of image expansional processing.

FIG. 37 is an explanatory view of image expansional processing.

FIGS. 38a and 38b are explanatory views of density reproducing interpolation.

DETAILED DESCRIPTION OF THE PREFERRED EMBODIMENTS

Figure 1:
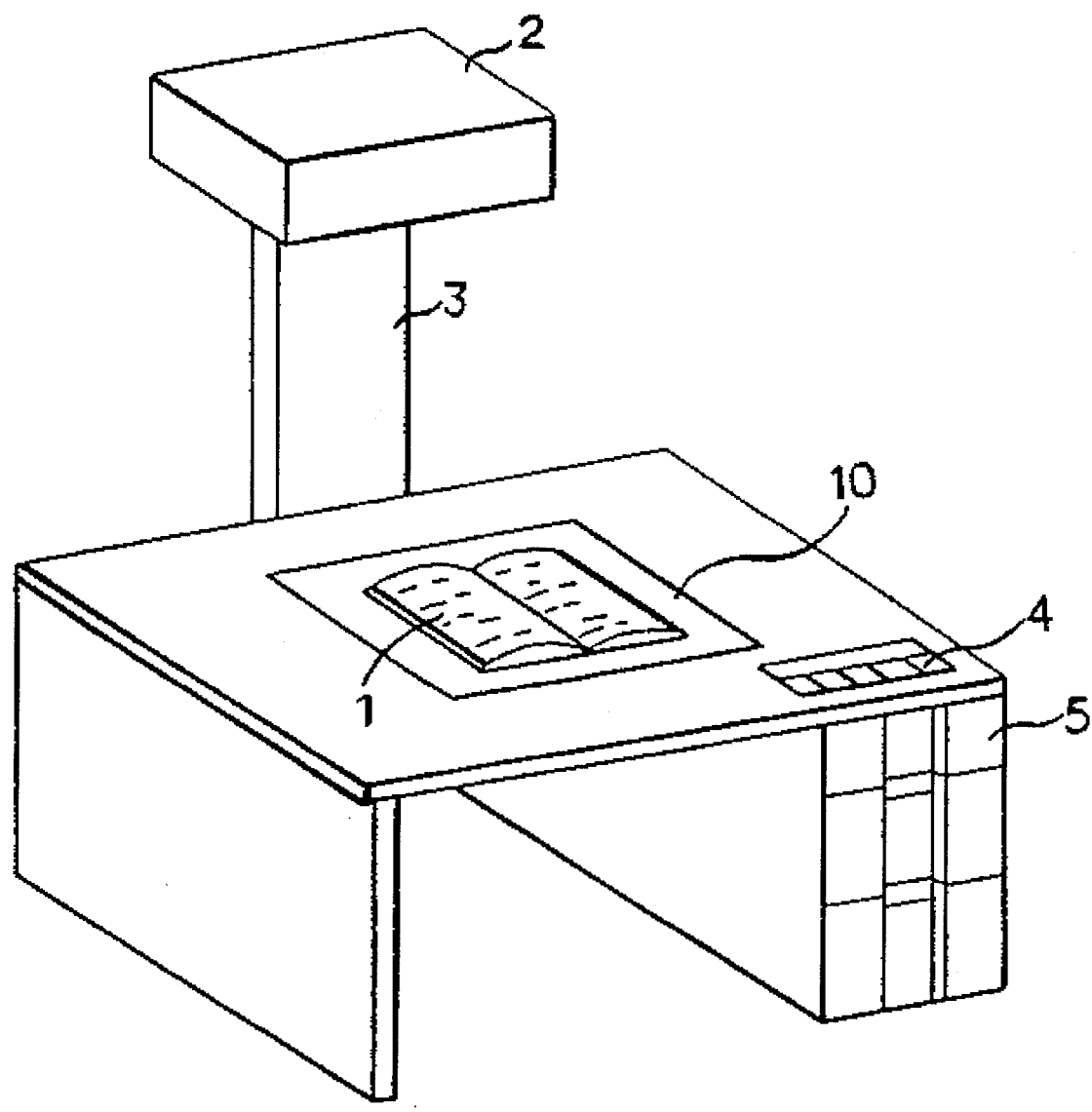
FIG. 1 shows an outward appearance of a document reading apparatus according to a first embodiment of the present invention.

Referring to the drawings, a first embodiment according of the present invention will be described in the following.

FIG. 1 shows the overall construction of a document reading apparatus. A document 1 is placed face up on a document holder 10. A reading section 2 is supported by a support member 3 at a predetermined distance so as to read the document 1 from above, and a space for operation Is formed therebetween. The distance is long enough for visual recognition of at least a readable area over the document. A group of switches 4 and a distortion rectifying circuit section 5 for rectifying output from the document reading means are also provided in this apparatus.

Figure 2:
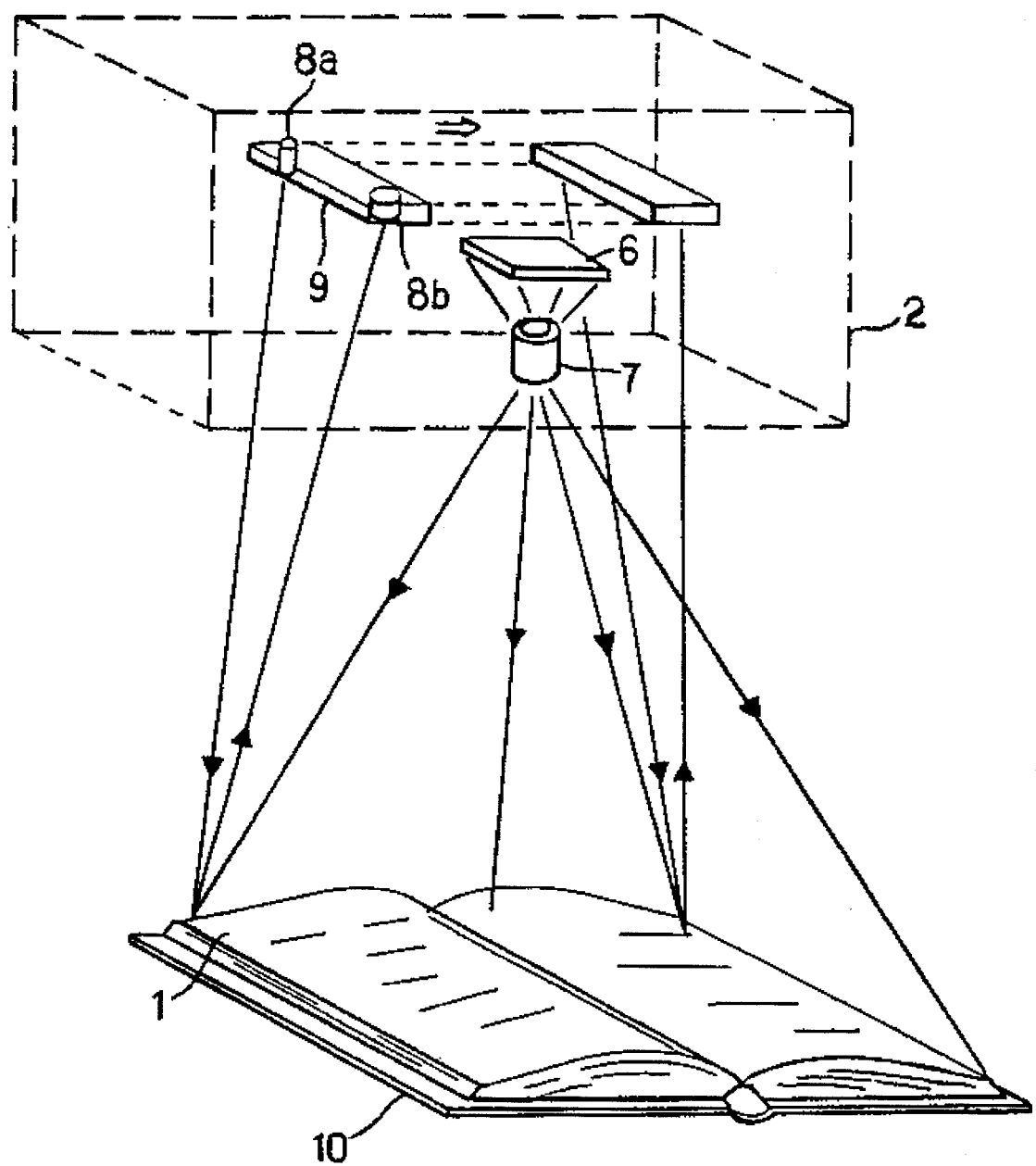
FIG. 2 is a perspective view of a reading section.
Figure 3:
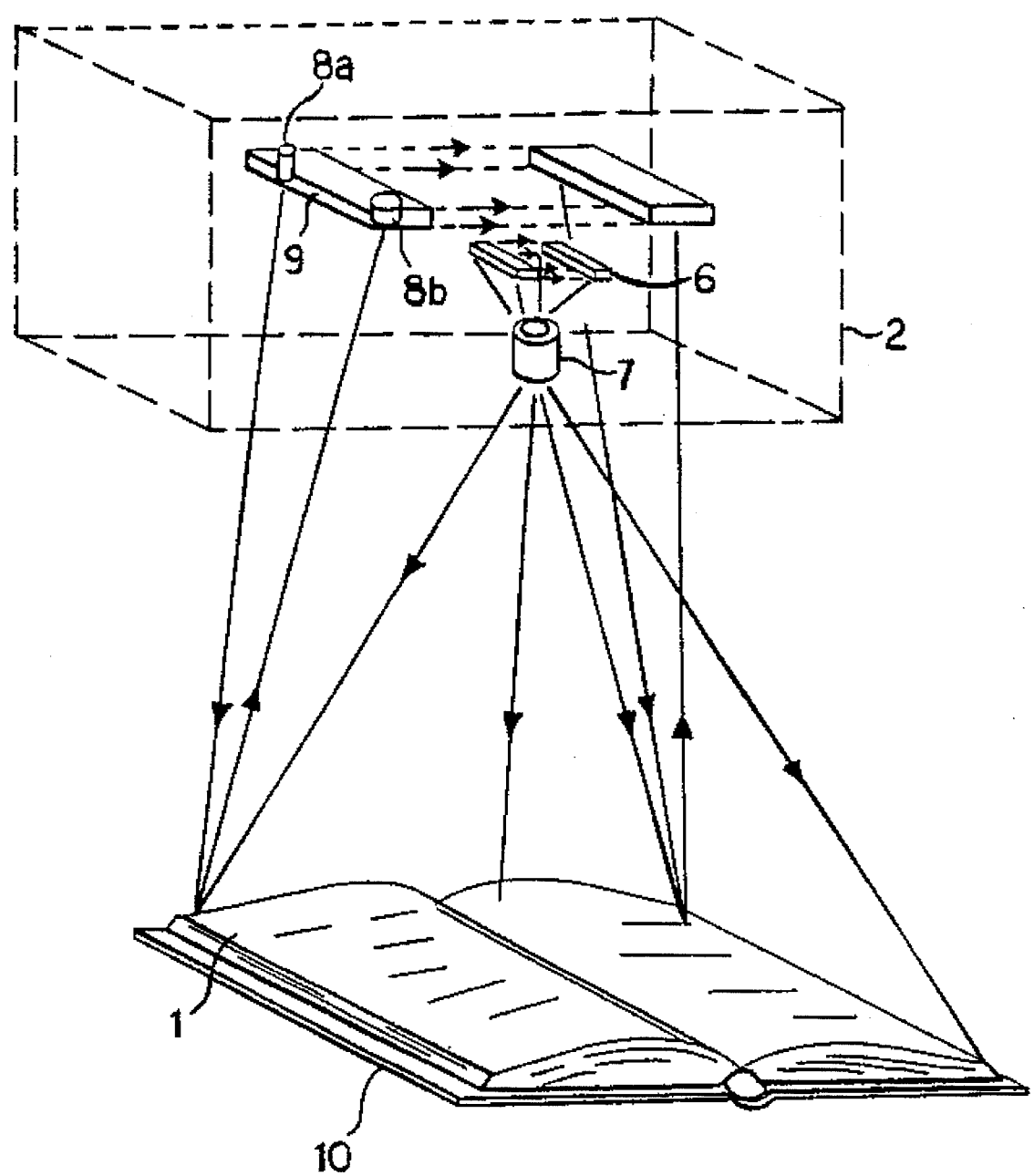
FIG. 3 is a perspective view of a reading section.

FIGS. 2 and 3 show the construction of the reading section 2 in detail. An image data of the document 1 is read through a lens 7 by an image sensor 6, which is a semiconductor photoelectric conversion device such as Charge Coupled Device (CCD), which is replaceable by an area sensor or a line sensor. FIG. 2 shows the construction employing an area sensor, FIG. 3 shows that of a line sensor. A distortion detecting board 9 measures height of the surface of the document 1 by so-called triangular distance measuring method: a light generated from an IR light emitting element 8a and reflected on the surface of the document 1 is received by a photoelectric element 8b. This board 9, provided with the IR light emitting element 8a and the photoelectric elements 8b, measures variations in the height of document surface, by scanning over the document 1. The method for distance measurement is not limited to the triangular distance measuring method. For example, phase-difference detection method is applicable.

Figure 4:
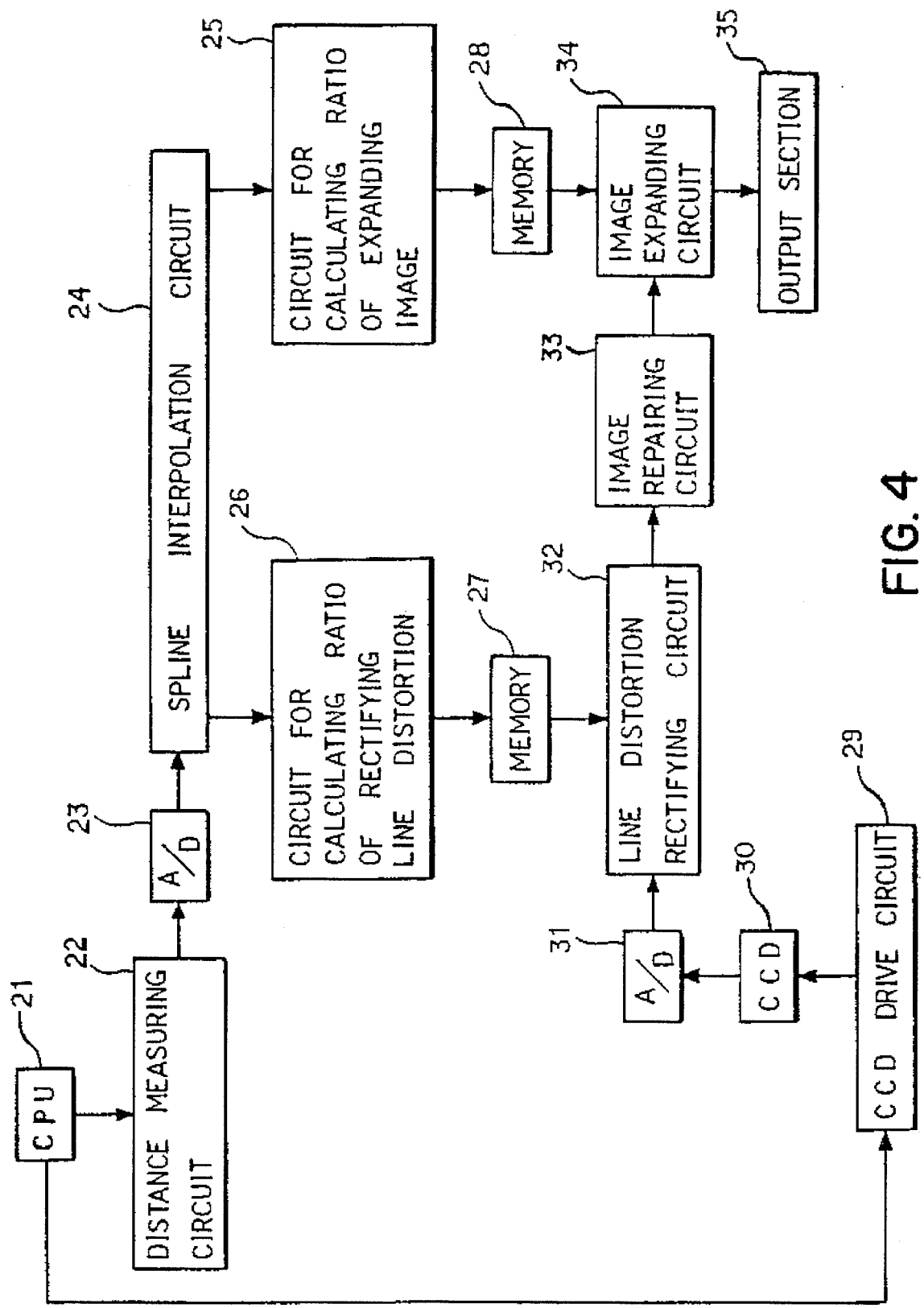
FIG. 4 is a block diagram showing a flow of electric signal.
Figure 5:
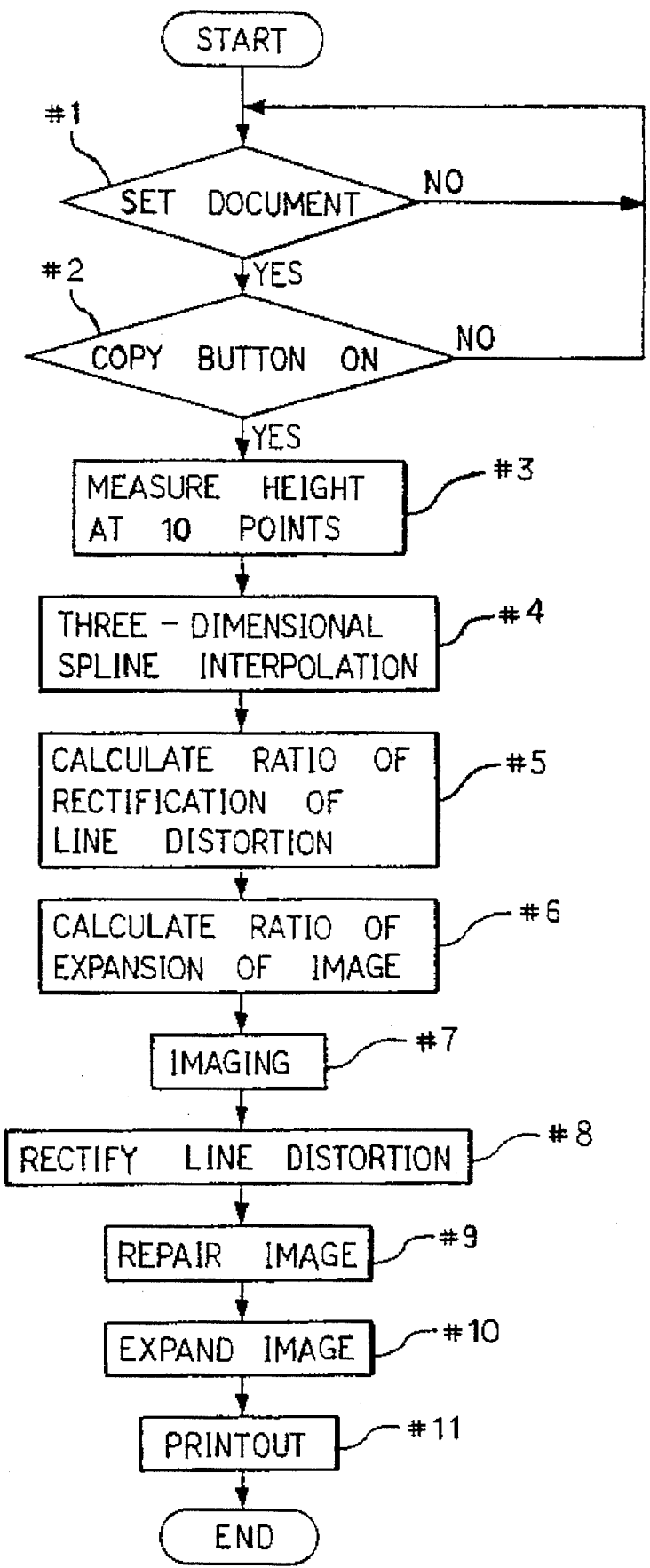
FIG. 5 is a flow chart showing an image copying operation.

FIG. 4 is a block diagram showing a flow of an electric signal of the document reading apparatus. FIG. 5 shows a flowchart of copying action with use of tills apparatus. The construction and operation of the embodiment is explained hereinafter, referring to FIGS. 4 and 5.

When the document 1 is set on the document holder 10 (YES at #1) and a copy button is pressed (YES at #2), a distance measuring circuit 22 is activated with an instruction of CPU 21. Then, the distortion detecting board 9 scans and measures a height at 10 points over one page of the document 1, namely, at 20 points over two pages spread out. The measurement of each point is carried out by triangular distance measuring method by the light emitting element 8a and the photoelectric element 8b shown in FIG. 2 (#3). The measured data of height, after being subjected to an Analog to Digital (A/D) conversion at an A/D converter 23, is sent to a spline interpolative circuit 24 and subjected to a 3-dimensional spline interpolative processing, and shape data of the document 1 is obtained therefrom (#4).

The data on the shape of the document 1 outputted from the spline interpolative circuit 24 is sent to a lane distortion rectifying ratio calculating circuit 26 and an image expansional ratio rectifying circuit 25. In the line distortion rectifying ratio calculating circuit 26, a ratio of line distortion rectification caused by the displacement in the direction of row is calculated (#5), and the value of calculated rectifying ratio is memorized in a memory 27 for effecting the process of line distortion rectification. On the other hand, in the image expansional ratio rectifying circuit 25, the ratio of expanding an image is calculated (#6) and the calculated value of expansional ratio is memorized in a memory 28 for effecting the image expansional processing.

Upon the completion of above processing, a CCD driving circuit 29 is driven with the instruction of CPU 21 shown in FIG. 4 for picking up an image of the document 1 by CCD 30 (above mentioned imaging sensor 6) (#7). The picked up image data is sent to a line distortion rectifying circuit 32 through A/D conversion at an A/D converter 31 and subjected to line distortion rectification (#8) by using the value of line distortion rectifying ratio which has been memorized in memory 27. Thereafter, the data outputted from the line distortion rectifying circuit 32 is sent to an image repairing circuit 33 and subjected to a blur repairing processing and an uneven luminance rectifying processing (#9). Further, the data outputted from the image repairing circuit 33 is sent to an image expansional circuit 34 to be subjected to the image expanding processing (#10) by using the value of aforesaid image expansional ratio memorized in the memory 28. The data outputted from the circuit 34 is sent to an output section 35 to be printed out (#11), and thereby a series of copying operation is completed.

Figure 6A:
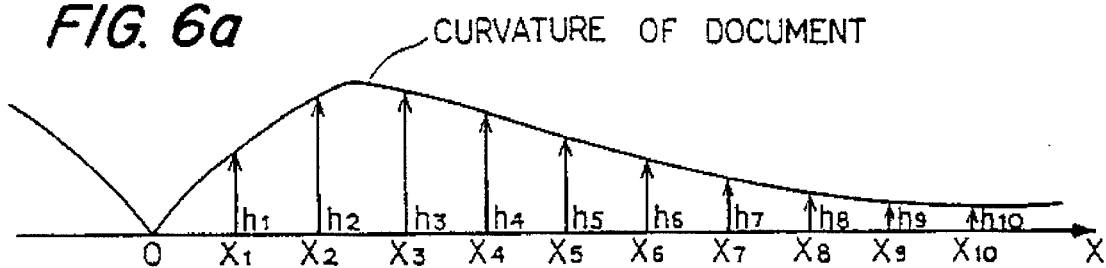
FIGS. 6a and 6b are explanatory views of spline interpolation.

Each of the above mentioned processing is explained concretely hereinafter. First, explanation is given to the spline interpolative circuit 24 and its process. FIG. 6(a) shows a measured height value and a position of measurement. An arrow of dotted line shown in FIG. 6 (b) represents an interpolative value of height calculated by the 3-dimensional spline interpolative processing. This interpolative processing allows to obtain a value of height at points of the same number as that of picture elements in horizontal direction of CCD.

Figure 7A:
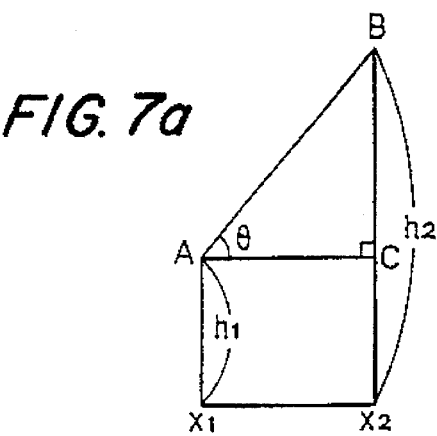
FIGS. 7a and 7b are explanatory views of straight line approximation.

It is explained hereinafter the reason why the interpolative value of height should be calculated by the spline interpolation other than measured value of height. The relation between the length of an image compressed due to curvature of the document and an actual length of the document is as follows: for example, in case of interval space between x1 and x2 in FIG. 6(a), assuming that a length of the compressed image is represented by a straight line A-C or a line x1- x2 in a trapezoid formed by 5 points of x1, x2, A, B and C in FIG. 7(a), if a curved line A-B can be approximated as a straight line A-B in the trapezoid, a relation formula in case of expansional processing of compressed image becomes as follows:

$$AB = AC \cdot 1/\cos \theta$$

Accordingly, the length of the Line A-B can be derived easily from the length of line A-C.

Figure 7B:
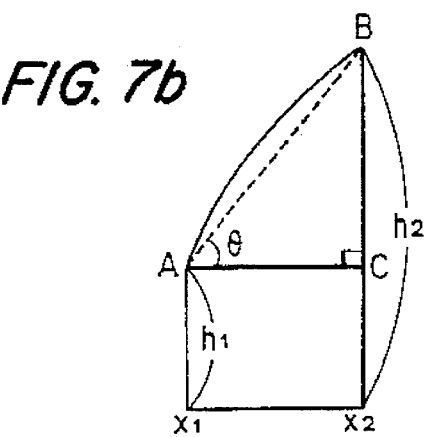

However, an actual shape of the curvature of the document is curved as indicated by the curved line A-B in FIG. 7(b). Hence, in case that the interval between measurement points is long and that an error in the length after expansional processing becomes large accordingly, it is impossible to approximate by a straight line. Hence, if the number of measurement points is small when measuring a height of the document, by accomplishing the 3-dimensional spline interpolative processing based on the value of each measurement point, namely, calculating an interpolative value of height at plural points (referred as an interpolative point hereinafter) between two measurement points, the mutual interval between the height measurement points or the interpolative points becomes short, and the error due to straight line approximation becomes small, accordingly the expansional processing by the above formula becomes possible.

Figure 6B:
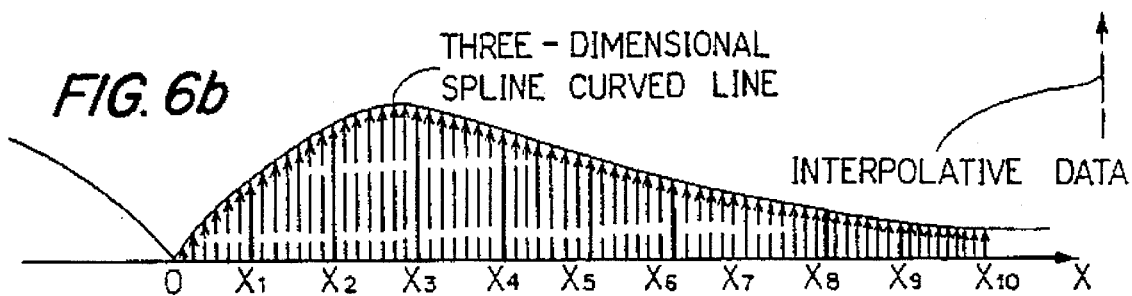
Figure 8:
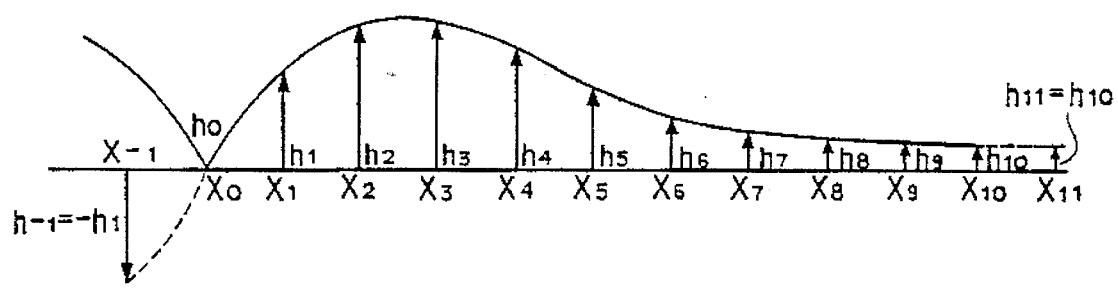
FIG. 8 is an explanatory view of approximate data in spline interpolation.

For obtaining a 3-dimensional spline function of x1-x10 in FIG. 6 (a), the unknown value of x0 and x11 is required as shown in FIG. 8. In this case, x0 is regarded as a region adjacent to a joint of a book and processed as its height $h0=0$. The height of $x(-1)$ shown in FIG. 8 is also required for obtaining an interpolative data of the section x0-x1 around the joint of the document. In this case, the interpolative data of x0-x1 is obtained by approximating the height of $x(-1)$ as $h(-1)=-h_1$. Also, the height of x11 can be processed as $h11=h10$, because x11 is edge of the document and further the document and the document holder are almost equal in height. As above described, the 3-dimensional spline function is obtainable in an entire range of the document.

Although the interval of the distance measurement data is rendered regular in executing the spline interpolative processing and the image expansional processing according to the described embodiment, more precise spline interpolation becomes possible by rendering a data interval around the joint short, wherein the ratio of image expansion is high. The 10 points are measured in the foregoing for the 3-dimensional spline interpolation by scanning of the board 9, if it is arranged so as to obtain the same number of measurement data as picture element as much as 1 line picked up by the CCD, more precise straight line approximation becomes possible.

Figure 9:
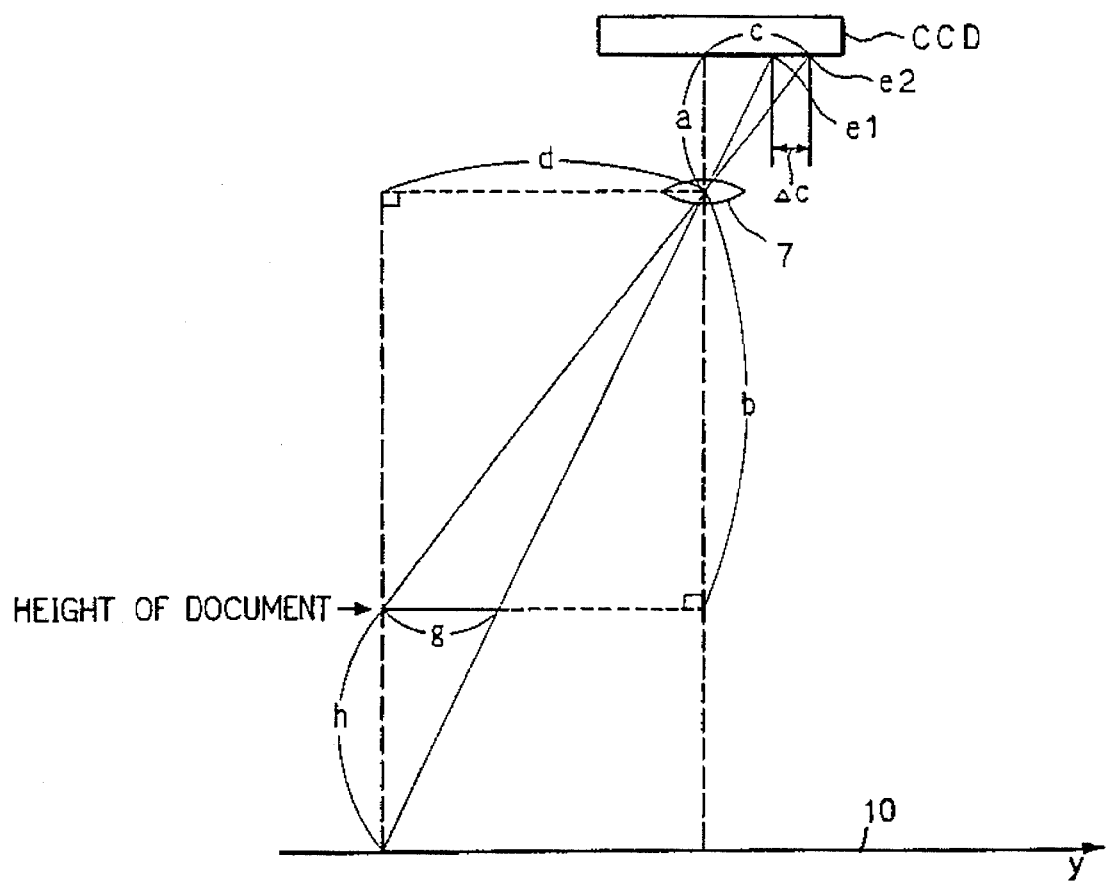
FIG. 9 is an explanatory view of a difference amount of in-focus position.

Next explanation is given to a ratio of line distortion rectifying ratio calculating circuit 26 and its processing. FIG. 9 is a drawing for explaining the cause of line distortion. The line distortion means here a distortion caused by a difference of in-focus position on the CCD owing to the height of the document surface in one point from the other. In FIG. 9, e1 represents an in-focus position on the CCD when the document is flat, and e2 represents an in-focus position on the CCD when the document is curved. Then, assuming that height of the document is h and that a distance to a lens therefrom is b, the following relation is established:

$$d: \quad g = (b+h): h$$
$$g = dh/(b+h)$$

Also, where the number of picture elements contained within distance c from a center of CCD to the in-focus position e2 is n, and the number of all picture elements in the direction of line of CCD is I, and the number of the picture element of in-focus position is i:

$$n = I/2 - i \quad (i < I/2)$$
$$n = i - I/2 \quad (i \geq I/2)$$

Figure 11:
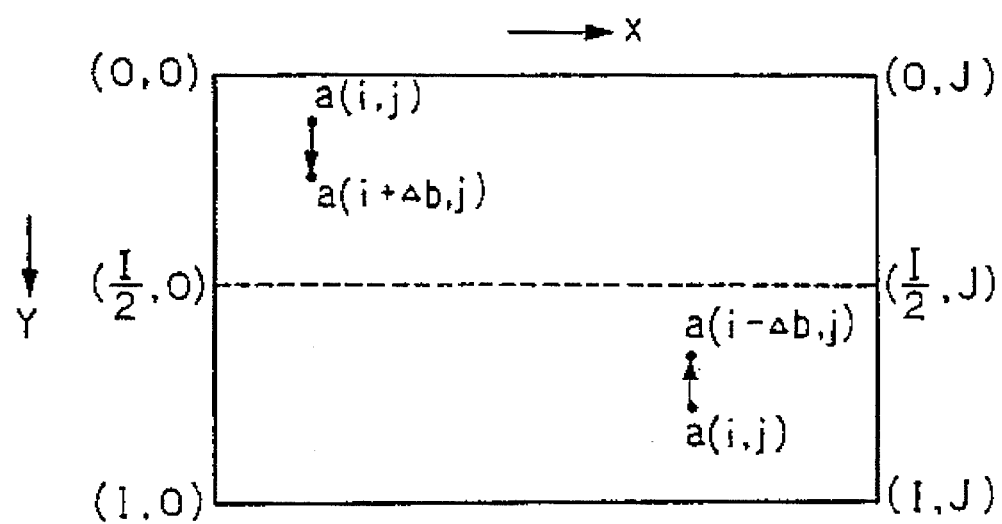
FIG. 11 is an explanatory view of coordinate transformation.

(with reference to FIG. 11 to be described later)

Further, where an amount of difference of in-focus position when the document is flat from when curved is $\Delta c$, assuming that the number of elements contained in $\Delta c$ is $\Delta n$, the following equations are established:

$$n: \Delta n = d: g$$
$$n: \Delta n = d: \{dh/(b+h)\}$$
$$d\Delta n = ndh/(b+h)$$
$$\Delta n = nh/(b+h)$$

Accordingly, if b and h are measured, $\Delta n$ is obtainable. The line distortion can be rectified by calculating each $\Delta n$ with use of the above equations and shifting image data by $\Delta n$ picture element.

Here, h can be read out from the memory which memorizes a distance measurement data. Also, b can be calculated based on a basic geometrical optics, if imaging magnification and focal length of lens are determined. The imaging magnification is determined by the input of the group of switches 4, and the focal length is determined by a distance measurement data. Where focal length of the lens is f, and the imaging magnification is m, the following equation is established:

$$(1/a) + (1/b) = (1/f)$$
$$b/a = m,$$

then, $$b = (m+1) \cdot f$$

The foregoing makes it possible to obtain $\Delta n$ with respect to every picture element.

Figure 10A:
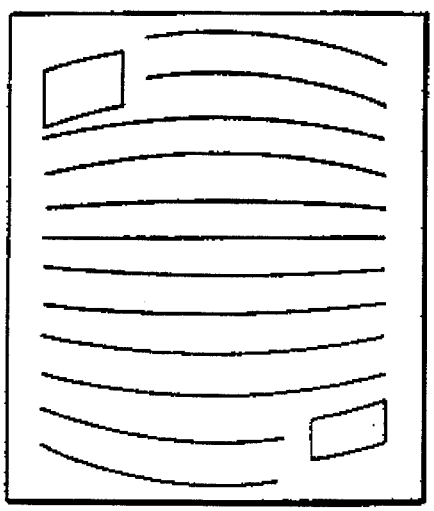
FIGS. 10a and 10b are explanatory views showing a result of image pickup of a document.
Figure 10B:
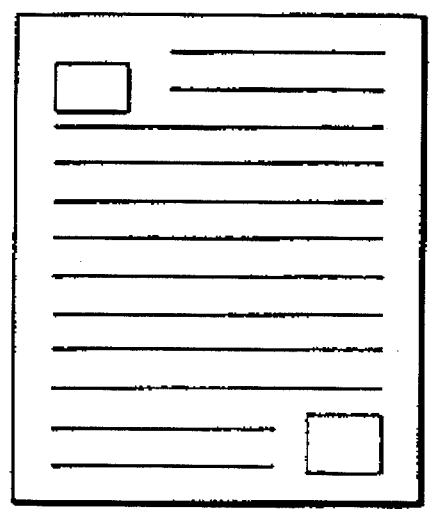

FIG. 10(a) shows an example of an image affected by line distortion. FIG. 10(b) shows an example of an image with its distortion rectified.

Explained next is an image expansional ratio calculating circuit 25. The ratio of expanding image is calculated based on the data of h1, ..., hn, which is a height data of x1, ..., xn point calculated by the spline interpolative circuit 24. The ratio of image expansion is the value of AB/AC in FIG. 7(a). An image expansional ratio $\alpha$ is as follows, $$\alpha(k) = \sqrt{1 + \left(\frac{h_{k+1} - h_k}{x_{k+1} - x_k}\right)^2} \quad (k = 1, \ldots, n)$$

$\alpha(1), \ldots, \alpha(n)$ can be obtained by calculating this one after another from k=1. The processing for obtaining this image expansional ratio $\alpha(k)$ is performed in the image expansional ratio calculating circuit 25.

Explained next is a processing of line distortion rectifying circuit 32. In this processing, each picture element of the image data is shifted by $\Delta n$ picture element, with use of value of $\Delta n$ calculated by the line distortion rectifying ratio calculating circuit 26 and memorized in memory 27. In other words, if an image data of i line, j row is a(i,j) and that the number of every picture element is (I×J), the following equations are established, as shown in FIG. 11:

$$a(i+\Delta n, j) = a(i, j) \quad (i \leq I/2)$$

$$a(i-\Delta n, j) = a(i, j) \quad (i > I/2)$$

As a result of executing the above processing concerning all picture elements of (I×J), the image in FIG. 10(a) is rectified as shown in FIG. 10(b).

Explained next is an image repairing circuit 33, wherein two processings are performed: a blur repairing processing and an uneven luminance rectifying processing. Explained first is the blur repairing processing. The image is blurred near the joint of document due to the large difference of height between a high and low point on the document surface. One method for repairing this blur is Laplacian processing. The edge in the density gradation between the bright and dark part of the image is emphasized by executing Laplacian processing of the image data, and thus, the blur of image is improved. Further, with A/D conversion processing or D/A conversion processing on the transfer line of the electric signal, as in the present invention, noise on the electric signal tends to occur. Therefore, sharper image is realized by removing the noise by $\gamma$ conversion processing.

Further explanation is directed to the uneven brightness rectifying processing. For example, it is assumed that image data of line i, row j before the processing are a(i, j) and the data after the processing are b(i, j). In this processing, a(i, j) are first detected as data of 1 line in the blank region containing no character or picture, located on the top and bottom of the document. FIG. 12 shows the density distribution in a(k, j), corresponding to the direction of x axis in FIG. 11. In FIG. 12, a point A wherein density falls corresponds to the joint of the document placed face up. In order to rectify the image data of this part, the uneven brightness is rectified by calculating the value of max/a(k, j) and multiplying this value with data of each picture element of line k, as shown in FIG. 13. By multiplying the beforementioned value of max/a(k, j) with the data of every picture element in each corresponding line, uneven brightness is rectified as for data of every picture element.

The foregoing is expressed by formula below. When the data on the picture element of line i, row j is a(i, j) before the uneven brightness rectifying processing, and the image data on the k-th line before the processing is white, the image data b(i, j) after the processing is calculated as follows, $$b(i,j) = \frac{\max}{a(k,j)} \cdot a(i,j)$$

Image repairing is realized by executing the above blur rectifying processing and uneven brightness rectifying processing.

Explained next is the image expansion circuit 34. The image data repaired in the image repairing circuit 33 is sent to the image expansion circuit 34. Also, as a result of calculating in the image expansion ratio calculating circuit 25, the value of image expansion ratio memorized in memory 28 is read out. Based on the image data and the image expansion ratio data, image expansion processing is performed.

The method of expansion of image data is described hereinafter. FIG. 14 shows, as an example, the case wherein 10 pieces of image data in a certain section are processed at the image expansional ratio of 1.4. The 10 pieces of image data are numbered consecutively from x1 as 1, 2, ..., 10. Here, assuming that the i-th picture element is expanded at image expansional ratio α, and that the number of the expanded picture element of the i-th picture element is j, and that the number of accumulated picture elements is n, the following equation is established:

$$j = \alpha \cdot i - i - n$$

In the above equation, when i=1, the following is established:

$$j = 1.4 \times 1 - 1 - 0 = 0.4$$

However, since j is not an integer, it is impossible to determine whether or not the number of picture elements after expansion is rendered 0 or 1. Therefore, j is made an integer by rounding off the value of j.

From the foregoing, the equation of expansional processing is expressed as below:

$$j = f(\alpha \cdot i - i - n)$$
$$f(x) = y + 1 \quad (x - y \geq 0.5)$$
$$\quad x: \text{value of } (\alpha \cdot i - i - n)$$
$$f(x) = y \quad (x - y < 0.5)$$
$$\quad y: \text{value of integral part of } (\alpha \cdot i - i - n)$$

Therefore, when i=1, the following is established:

$$j = f(0.4) = 0$$

Therefore, the image data of i=1 becomes the image data of k=1. In this case, since the accumulated number of picture elements after expansion is 0, n=0.

Similarly, when i=2, $$j = f(1.8) = 2$$

Accordingly, the data of the picture element of i=2 becomes the image data of k=2 and k=3 in FIG. 14. The accumulated number of picture elements after expansion is 1 in this case, therefore, n=1.

As for i=3, 4, ..., 10, the calculation is performed similarly. FIG. 15 shows which number of data among picture element i=1, 2, ..., 10 before expansion processing is applied to the element of k=1, 2, ..., 14 in FIG. 14 after expansional processing. The expansion of the image is performed by executing these processings to picture elements in every section.

Figure 16A:
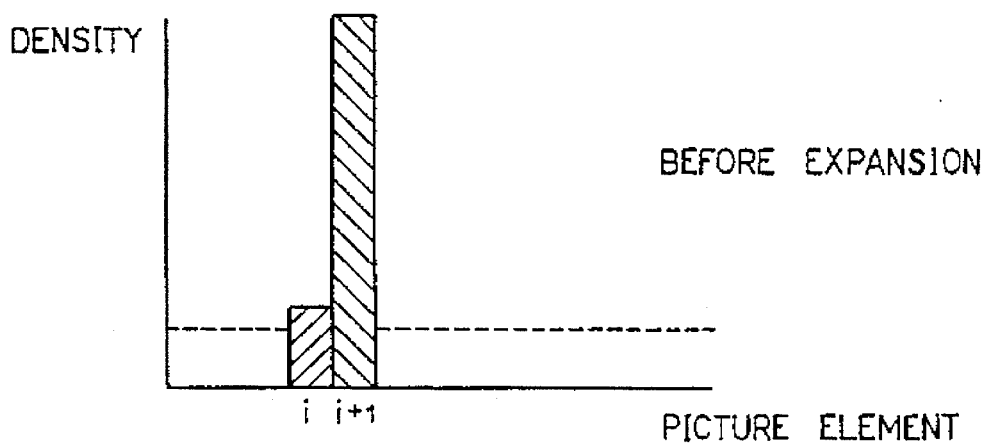
FIGS. 16a and 16b are explanatory views of density reproducing interpolation.
Figure 16B:
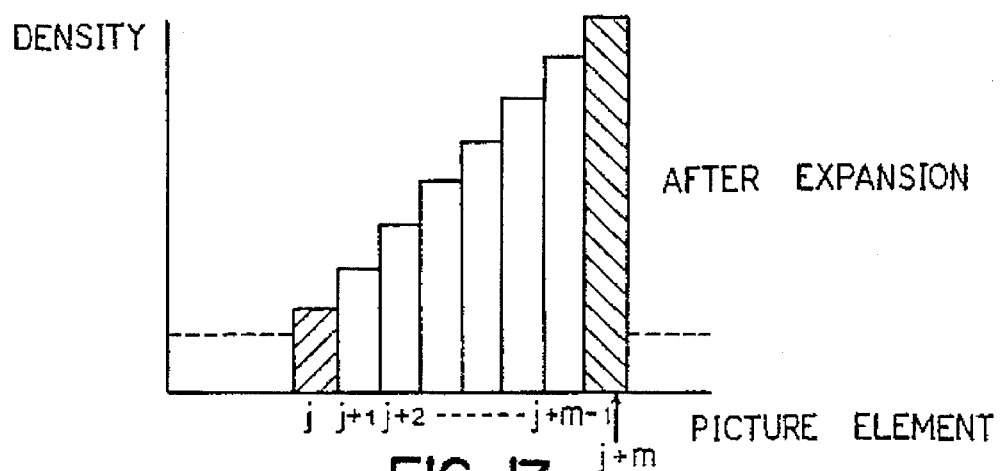

As a better method, in case expanding the data of i-th picture element to m pieces of element, it may be possible to execute the processing as shown in FIG. 16 based on the data of i-th and i+1th picture element, in place of applying data of i-th picture element as it is to m pieces of picture element after processing. That is, the image expansion is performed by density interpolation of the data on picture elements before expansion processing while applying average density gradation thereto. The (j+1)-th image data a(j+1) in FIG. 16 can be calculated as below (j=0, 1, ..., m−1):

when $m \geq 1$ $$a(j+1) = a(j) + \frac{1}{m} \{a(j+m) - a(j)\}$$

when $m = 0$
$$a(j+1) = a(j)$$

The foregoing processing makes it a most appropriate sequence to perform the line distortion processing and the blur rectifying processing before the image expansion. It will be explained hereinafter why the line distortion should be rectified before image expansion. If executing the line distortion rectification after image expansion, the value of height necessary for rectifying the line distortion becomes unknown with respect to the picture elements obtained by image expansion, and then line distortion can not be rectified precisely. Therefore, as a sequence of processing, it is necessary to perform line distortion rectification before image expansion.

Figure 17A:
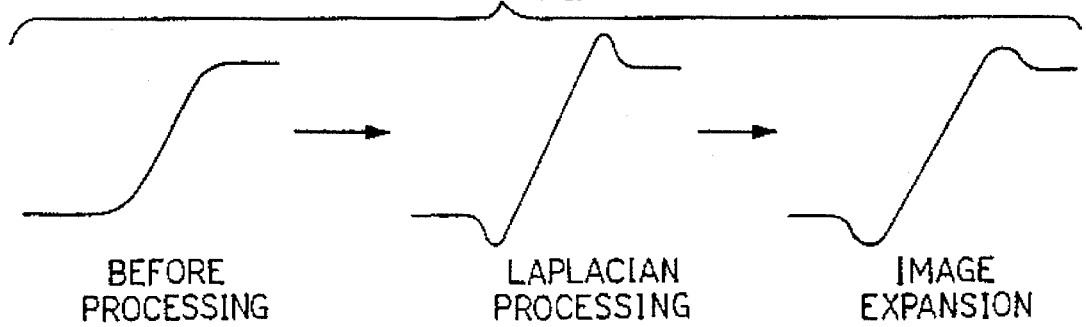
FIGS. 17a and 17b are wave views of curved lines showing density distributions.
Figure 17B:
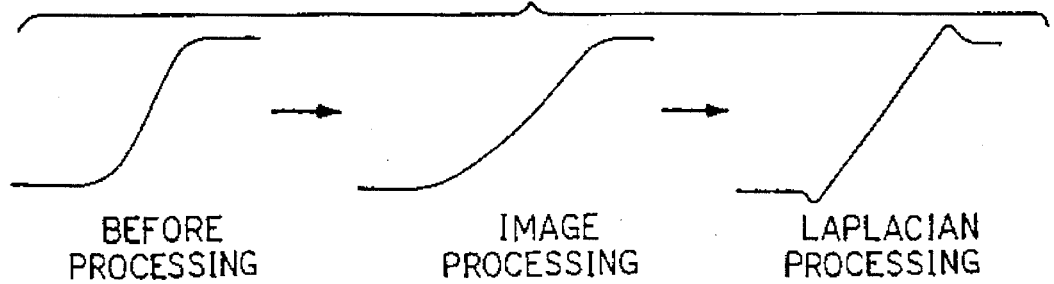
Figure 18:
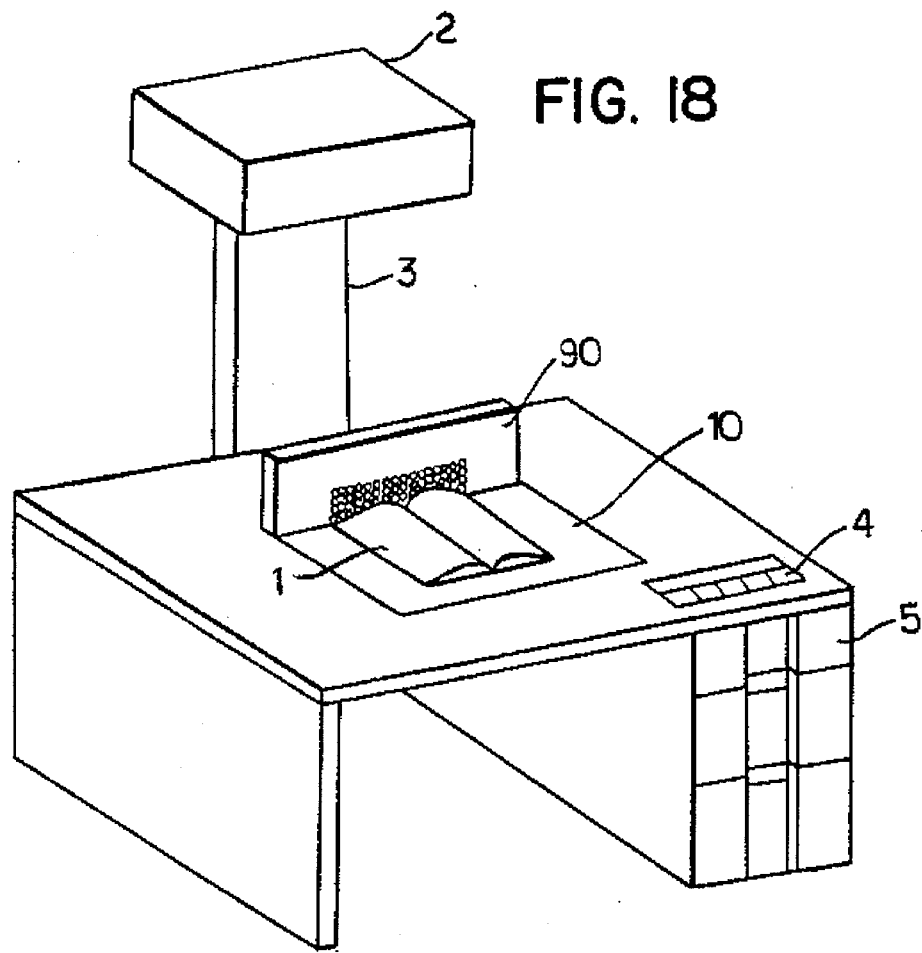
FIG. 18 is an outward appearance of a document reading apparatus according to an embodiment using a photosensor as distance measuring means.

It is explained next why image repairing is performed before image expansion. At the time of image expansion, the density gradation becomes small in the image data after expansion processing, the edge being gentle, since density interpolation is carried out. Therefore, even if the beforementioned Laplacian processing is executed in image repairing after image expansion, the edge is hardly emphasized, and hence the effect of image repairing is minimized. On the other hand, performing image expansion after Laplacian processing is effective for repairing the characters of small size or thin line, because the edge is emphasized. FIG. 17(a) shows the shape of the edge of density distribution curve in the case of performing the Laplacian processing in image repairing before image expansion, and FIG. 17(b) shows the shape of the edge in the case of performing the Laplacian processing in image repairing after image expansion. For these reasons, it is more effective to perform image repairing before image expansion.

Figure 19:
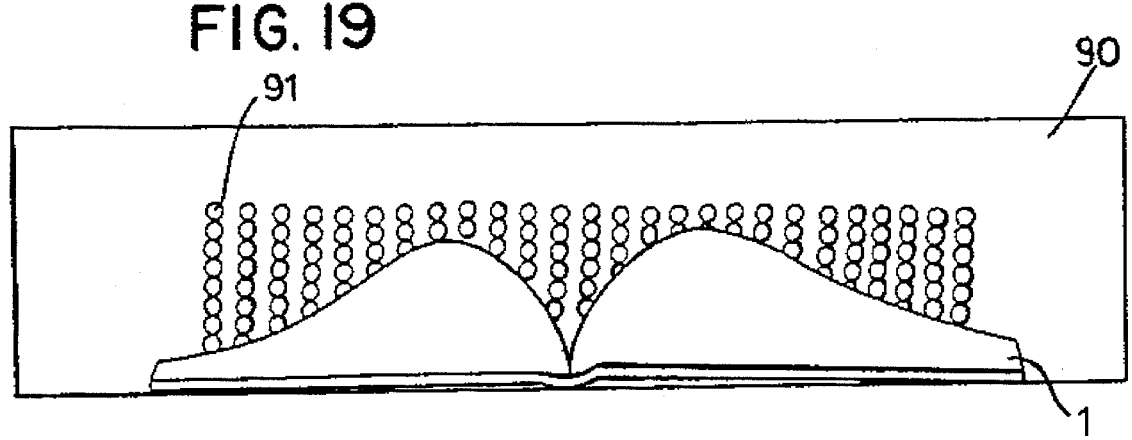
FIG. 19 is a side view of a distance measuring means using a photosensor.
Figure 20:
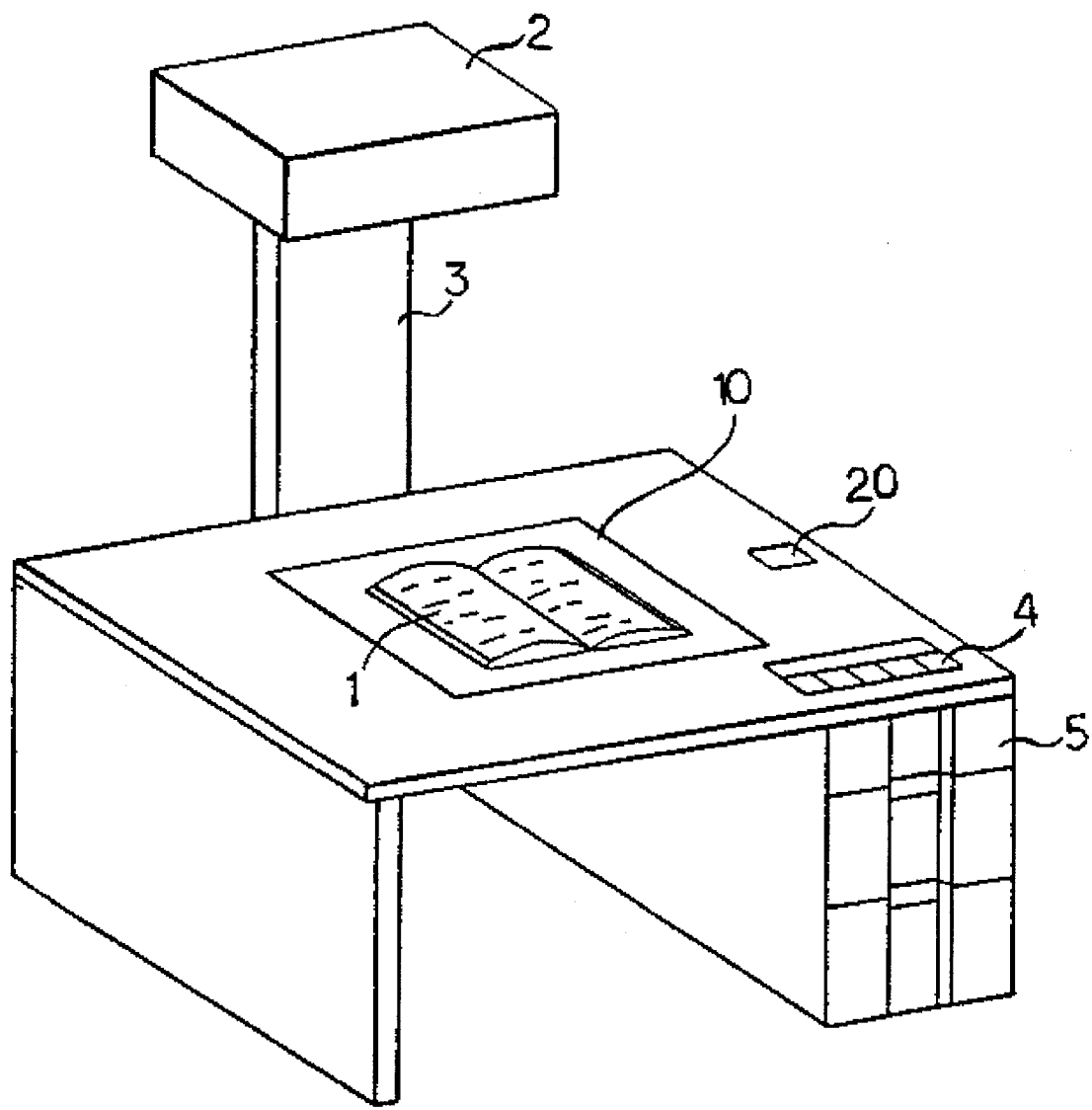
FIG. 20 shows an outward appearance of a document reading apparatus according to a second embodiment of the present invention.

FIGS. 19–20 show distance measurement means according to another embodiment. A board 90 providing photo sensor 91 is disposed perpendicularly on a document holder 10. The document 1 is stuck to the board 90 so that the light of photo sensor 91 is cut off where the document exists. This construction allows measuring the height of the document corresponding to the output from the photo sensor 91.

A second embodiment of the present invention will be described in the following. FIG. 20 shows an overall construction of a document reading apparatus according to the second embodiment. External construction of the apparatus is similar to the first embodiment shown in FIG. 1 except that a curvature warning buzzer 20 is provided.

Figure 21:
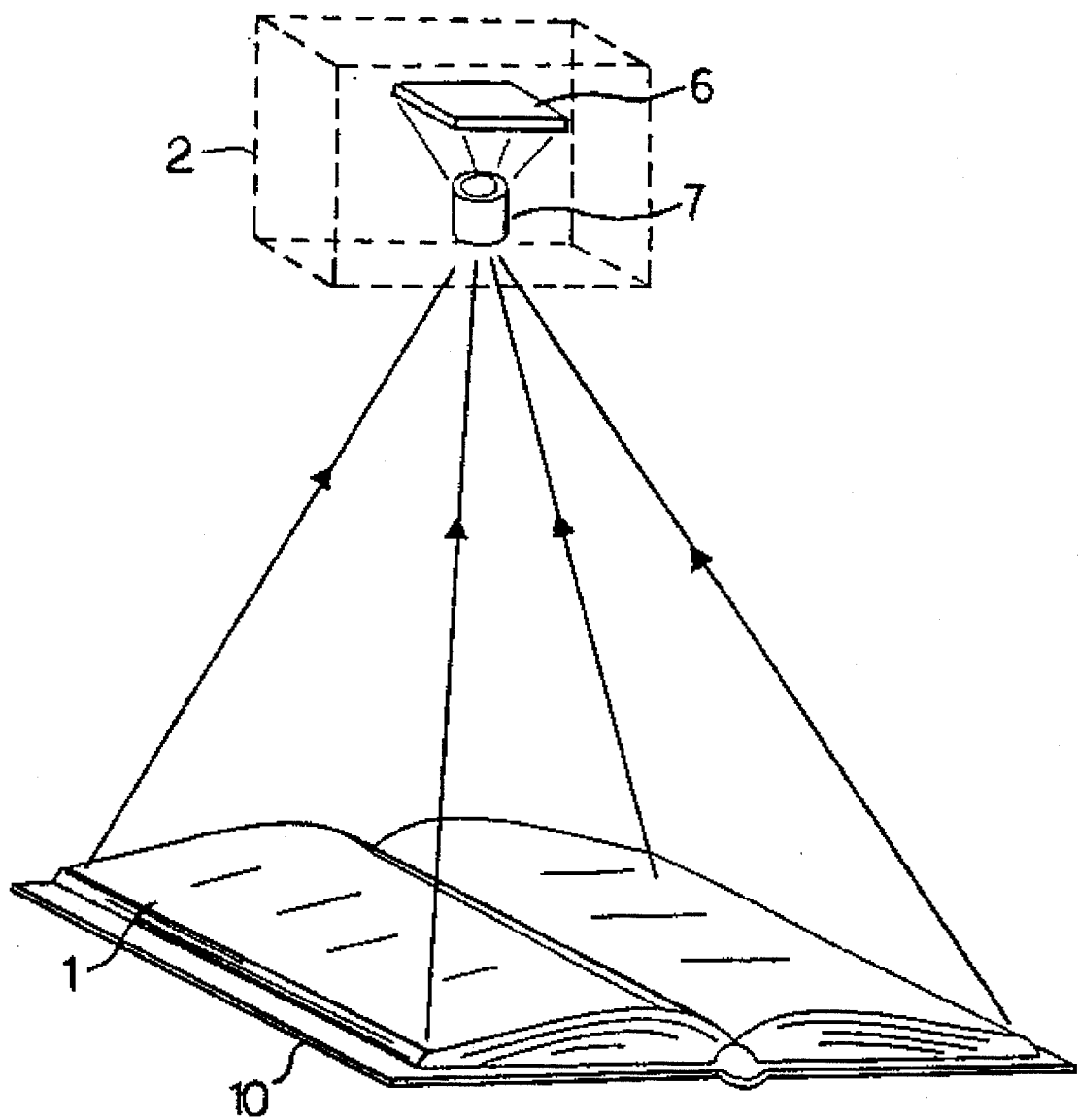
FIG. 21 is a perspective view showing the construction of a reading section.
Figure 22:
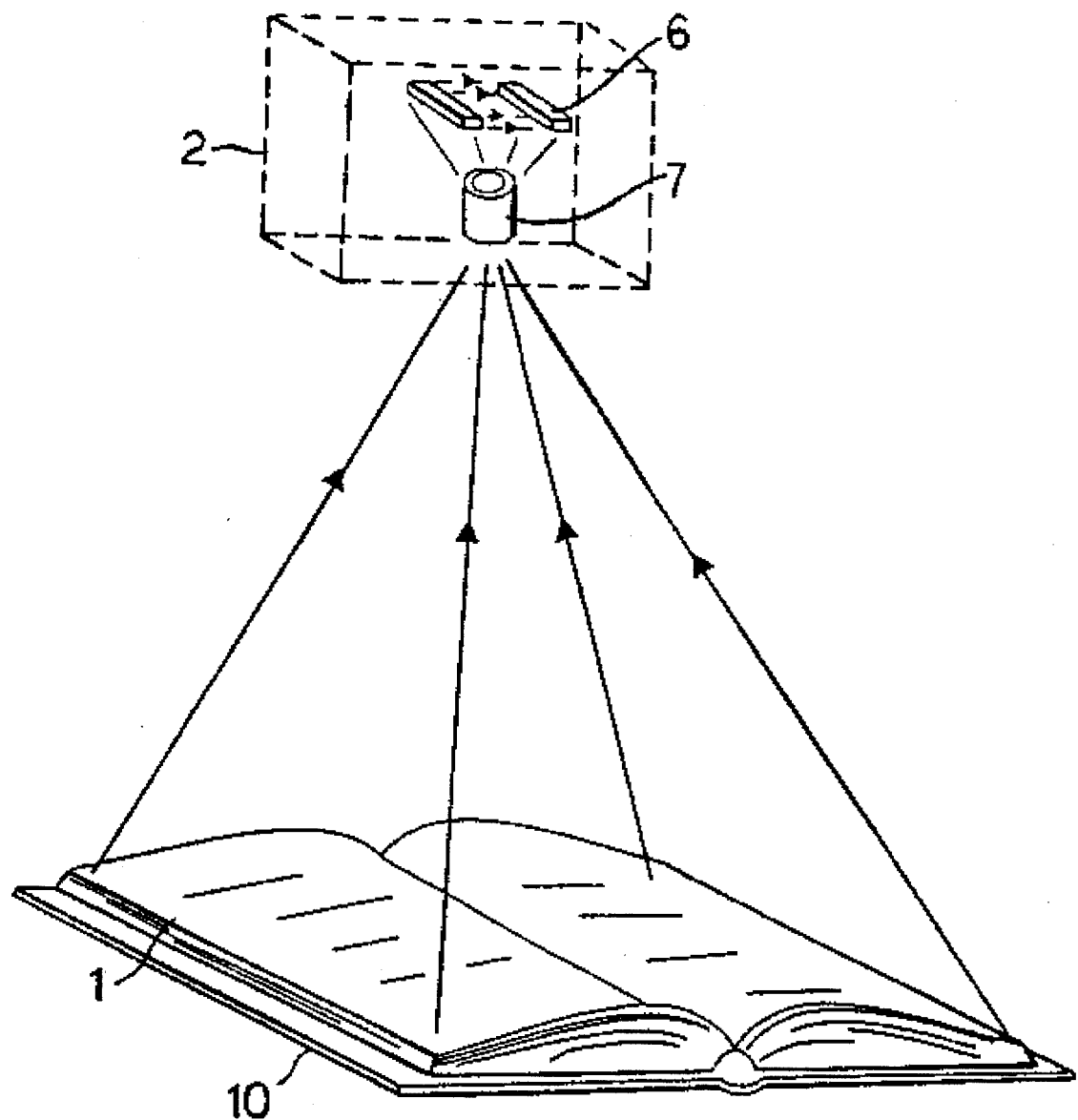
FIG. 22 is a perspective view showing the construction of the reading section.

FIGS. 21 and 22 show the construction of the document holder 10 on which the document 1 is placed and the reading section 2. The image data on the document 1 is read out through an in-focus lens 7 by an image sensor 6. The image sensor 6 is a semiconductor photoelectric conversion element such as CCD, replaceable by an area sensor or a line sensor. FIG. 21 shows the case of area sensor, FIG. 22 shows that of a line sensor.

Figure 23:
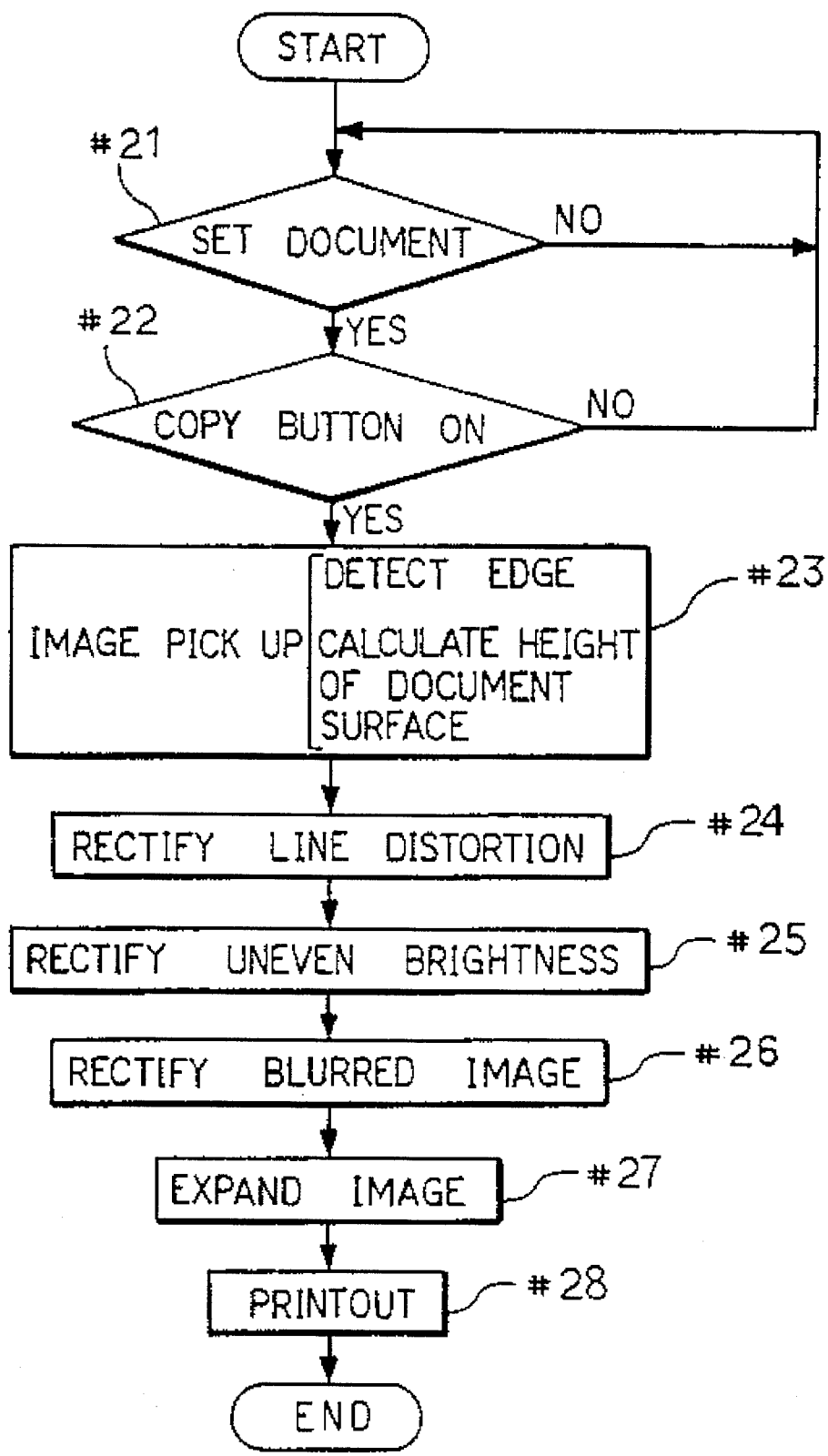
FIG. 23 is a flow chart showing an image copying operation.

FIG. 23 shows a flowchart of copying processings with use of the document reading apparatus of the second embodiment. The processing and method of rectifying distortion is explained below. Here, a line sensor is used as an image sensor.

Figure 24:
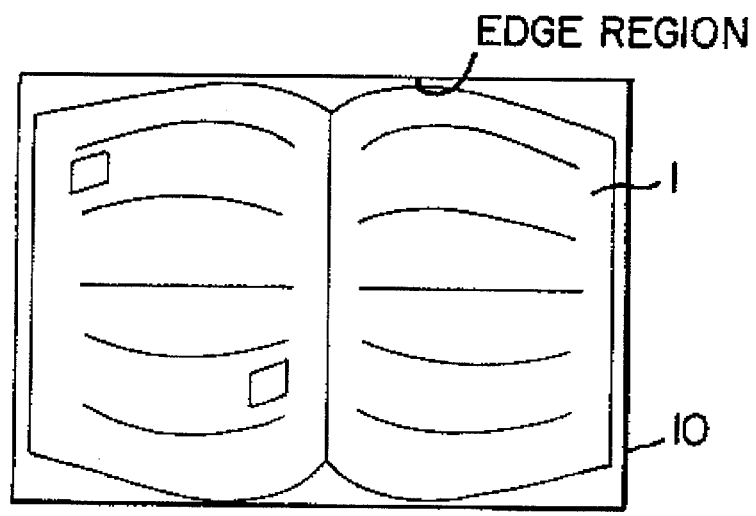
FIG. 24 is a view showing an image pickup size of a document.
Figure 25:
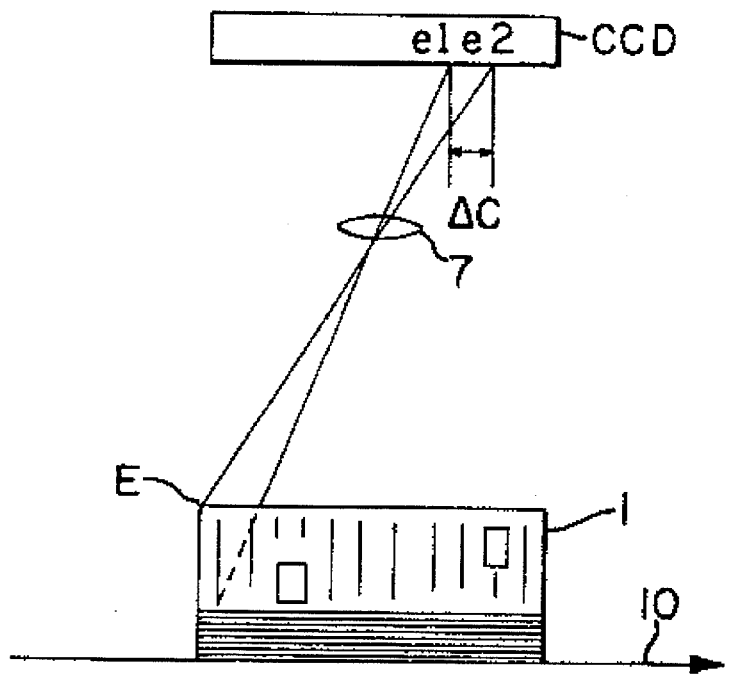
FIG. 25 is a view showing the difference of in-focus position on CCD in an edge region of single page of the document between a curved document and flat one.

An operator sets a document to be copied on a predetermined position within an imaging possible area of the image sensor (#21) and presses a copy button when the document has been set (#22). When the copy button is switched ON, the document on the document holder is imaged (#23). The document holder is colored some other color than white, for example, black. As shown in FIG. 24, the image of the document is picked up within an area little larger than document size in order to clarify the shape of the boundary region (referred as an edge region hereinafter) between the document 1 and the document holder 10. As described in detail later, an edge detection and a calculation of height of document surface are also carried out in this imaging process. Next, each processing of line distortion rectification (#24), uneven brightness rectification (#25), blur image rectification (#26) and image expansion (#27) is performed as for every picture element, and then the image is printed out (#28). In this way, the copying operation is completed.

The explanation is given to each processing step. The edge detecting processing is explained first. The edge region of a curved document such as a bound book is different from that of a flat document in an in-focus position on the CCD, as shown in FIGS. 25–29. The difference of the in-focus position is represented by $\Delta c$, $\Delta c1$ and $\Delta c2$. In FIG. 28, c represents a distance from the center of CCD to an in-focus position of the edge region of the document, H represents a distance from the document holder 10 to the lens 7, e1 represents an in-focus position of the edge region when document is flat, e2 represents an in-focus position of the edge region when document is curved. E represents the edge region of the document. If value of each of the above mentioned c, $\Delta c$ and H is known, the document surface height h is obtainable from the following equation:

$$h = (\Delta c/c) \cdot H \tag{1}$$

Figure 29:
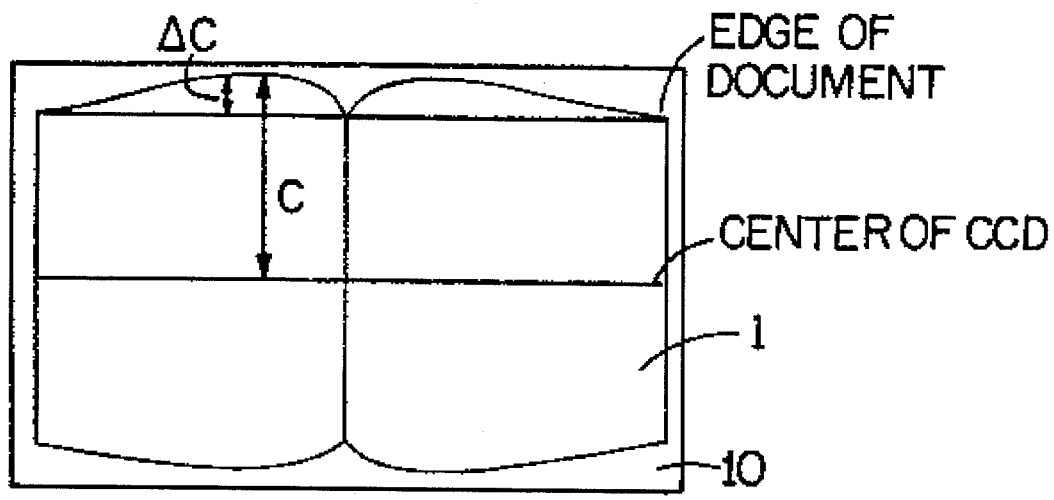
FIG. 29 is a view showing the relation between c and $\Delta$ c on a picked up image of the document.

The value of c is obtained by calculating the number of picture elements contained within the in-focus position e2 of the edge region of the curved document the center position of CCD, as shown in FIG. 29. The value of $\Delta c$ is obtainable by calculating the number of picture elements contained within the in-focus position e2 from the in-focus position e1 of the edge region of the document height h=0. The value of H is obtained from the variation amount of zooming lens. The foregoing allows to obtain the same number of data on the document height as picture elements as much as 1 line picked up by CCD.

Figure 26:
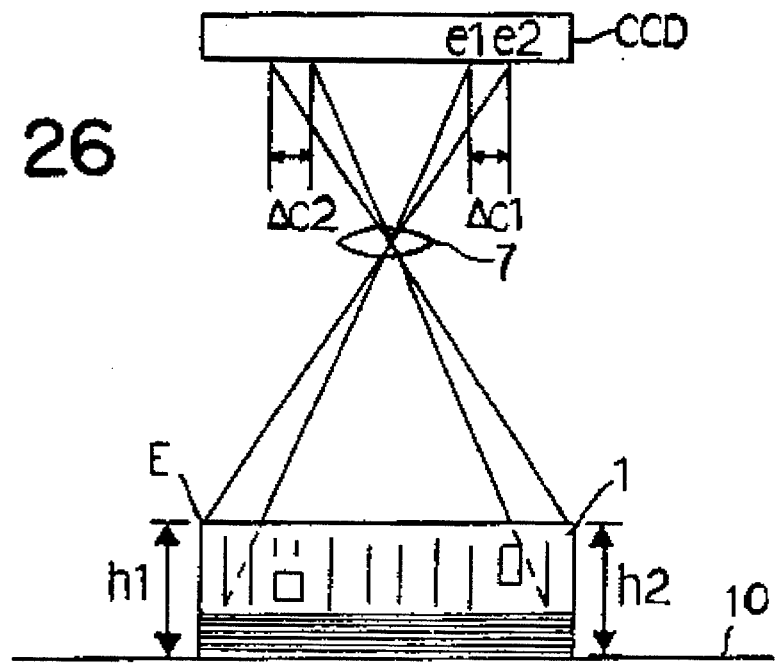
FIG. 26 is a view showing the difference of in-focus position on CCD in both edge regions of the document between a curved document and flat one.

Further, instead of detecting the edge region concerning only a single page of opened pages of the document, it is possible to detect both edge regions of the document as shown in FIG. 26, calculate both height, h1 and h2, from the below equations and obtain h based on the value of h1 and h2 by means of average or weighted average method:

$$h1 = (\Delta c1/c) \cdot H$$

$$h2 = (\Delta c2/c) \cdot H$$

Figure 27:
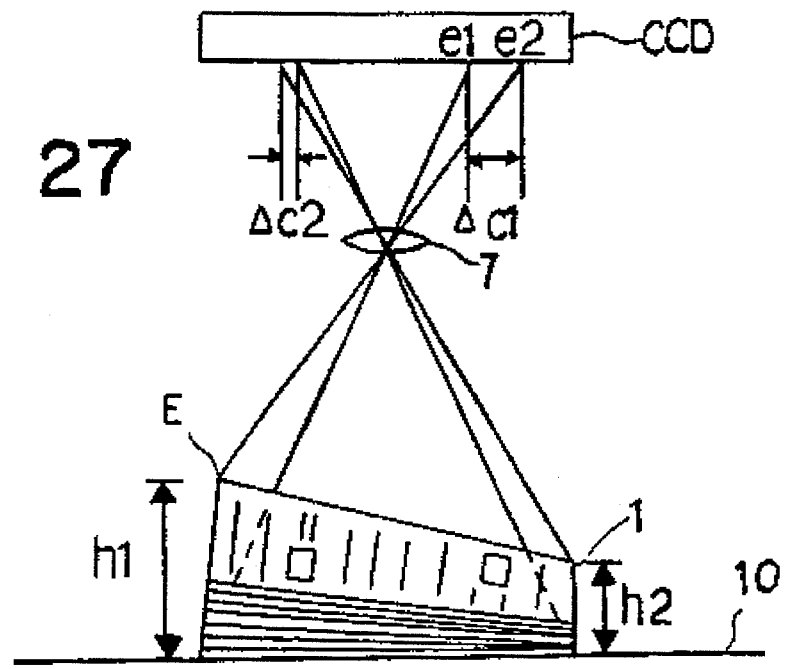
FIG. 27 is a view showing the difference of in-focus position on CCD in both edge regions of the document between a curved document and flat one.
Figure 28:
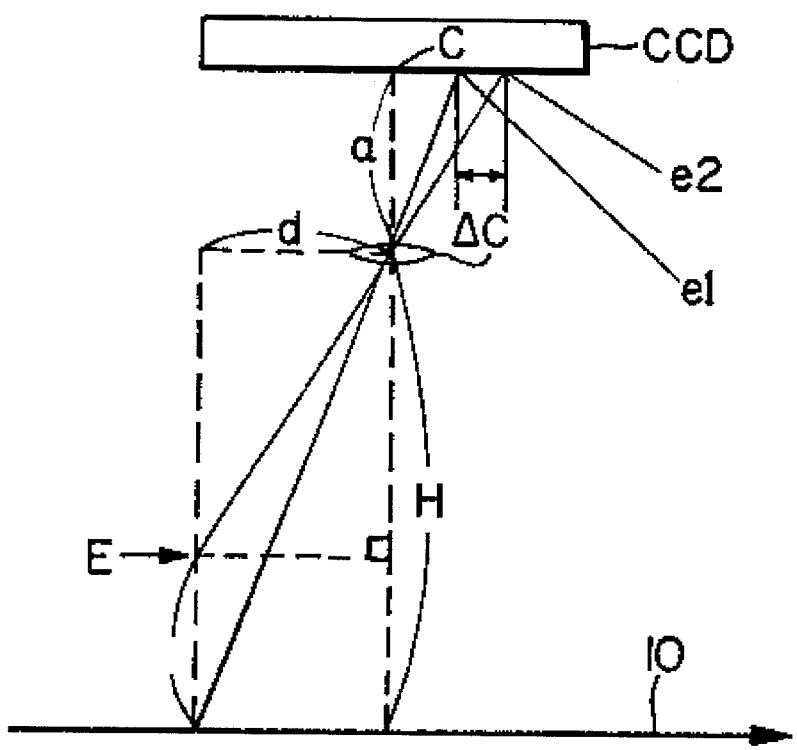
FIG. 28 is an explanatory view showing a height of the document, h.

Also, as shown in FIG. 27, in case the value of |h1–h2| exceeds a predetermined value, It becomes impossible to perform the distortion rectification accurately. In such a case, the curvature warning buzzer 20 shown in FIG. 20 is sounded or LED is lit informing the operator to reset the document.

Figure 30:
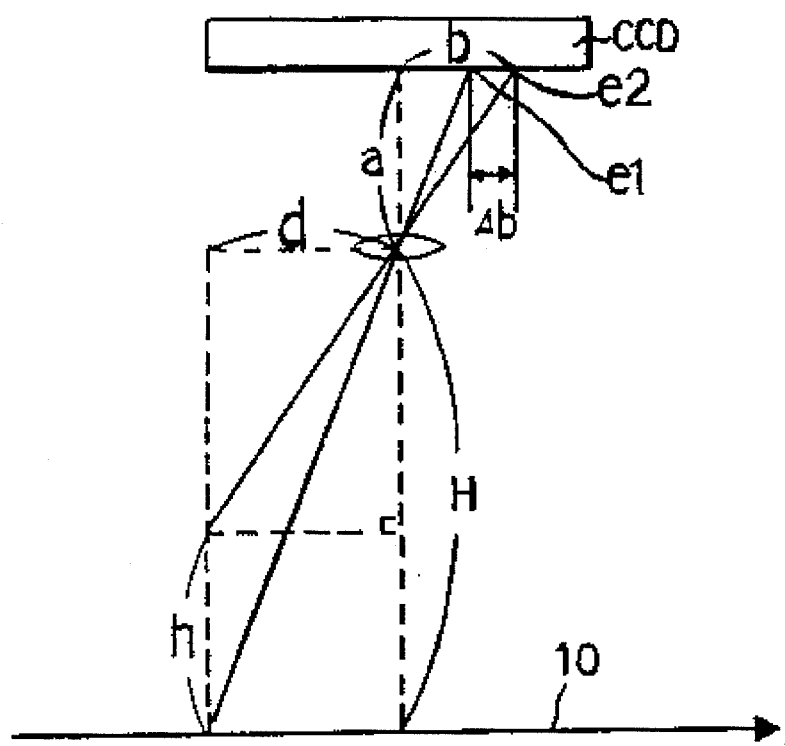
FIG. 30 is an explanatory view or an equation of amount of difference of in-focus position, $\Delta$ b.
Figure 31A:
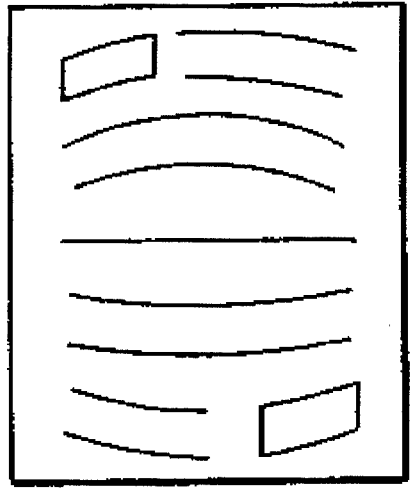
FIG. 31($a$) is a view showing result of imaging of the document, in case the document is curved.
Figure 31B:
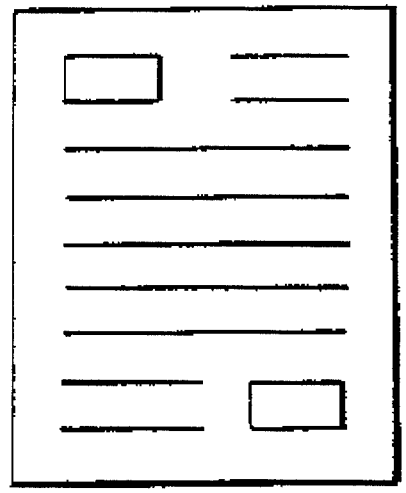
Figure 39:
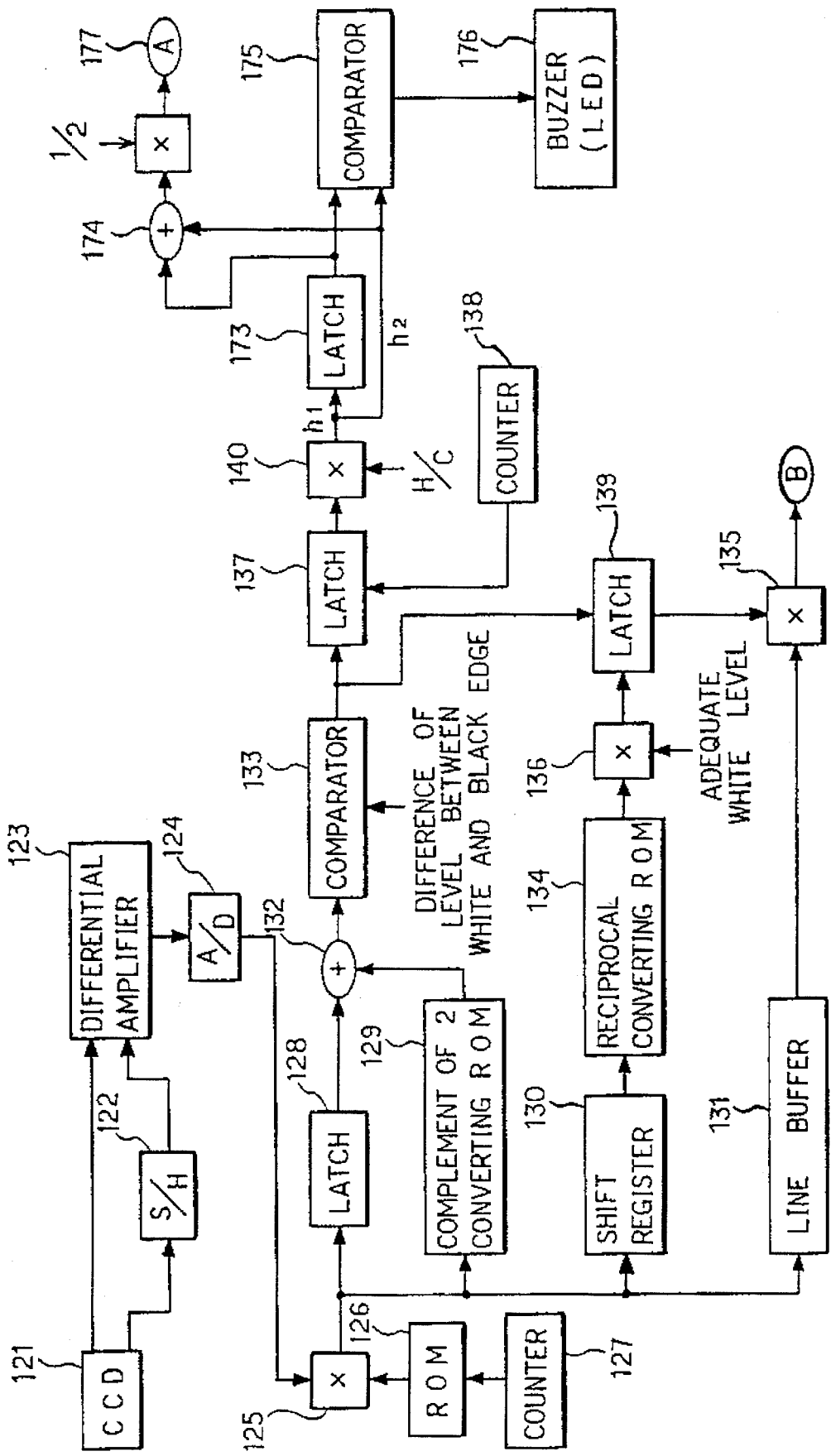
FIG. 39 is a block diagram showing a processor of rectifying distortion.
Figure 40:
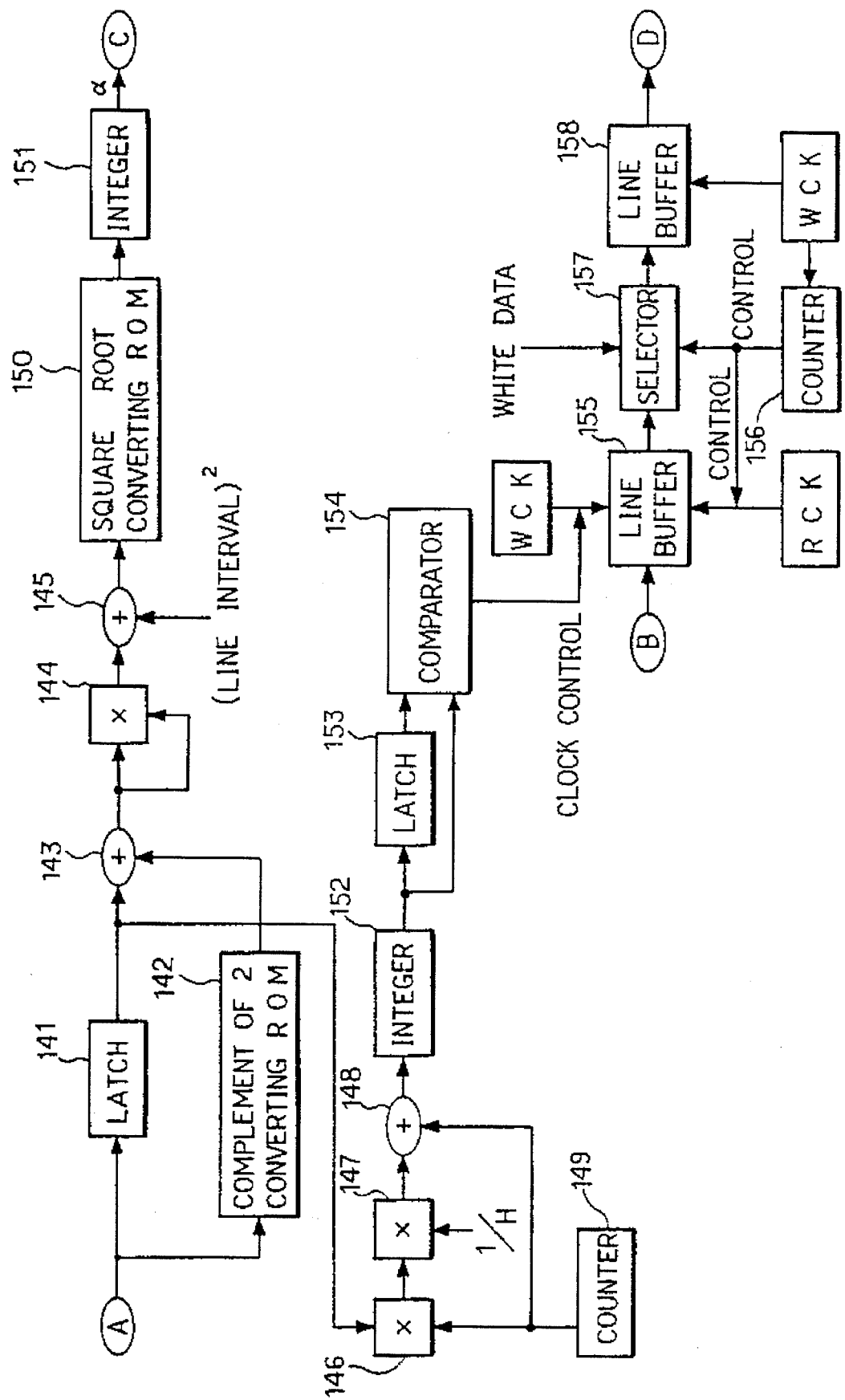
FIG. 40 is a block diagram showing a processor of rectifying distortion.
Figure 41:
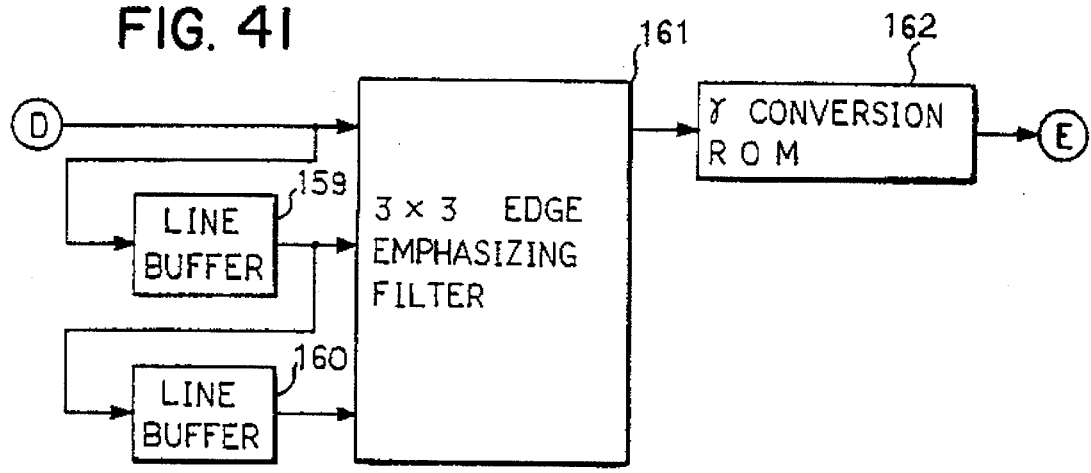
FIG. 41 is a block diagram showing a processor of rectifying distortion.
Figure 42:
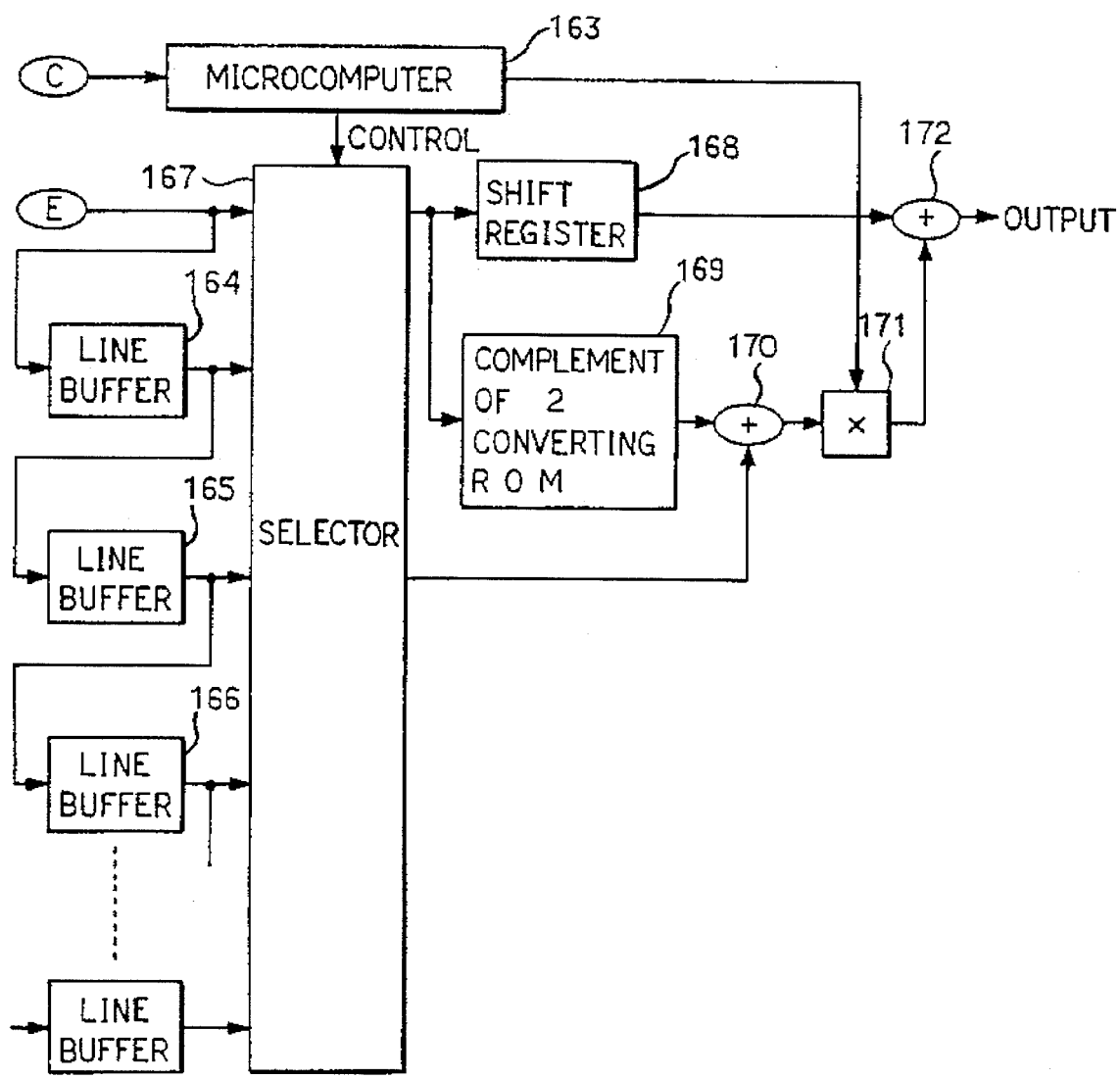
FIG. 42 is a block diagram showing a processor of rectifying distortion.

The explanation is next given to the rectification of line distortion (#24) based on the document height data with reference to FIGS. 30–32. The line distortion is caused due to the difference of in-focus position on CCD between a curved document and a flat document as shown in FIG. 30. FIG. 31(a)(b) shows an example of line distortion: (a) shows a picked up image when document is curved, and (b) shows a picked up image when document is flat. As apparent from FIG. 30, $\Delta b$, an amount of difference of in-focus position, is obtainable from the following equation:

$$\Delta b = (h/H) \cdot b \tag{2}$$

The line distortion is rectified by coordinate transformation of a(i, j), which is image data on i-th line, j-th row, in accordance with the following equations, based on $\Delta b$ obtained from above equation. FIG. 13 is a drawing for explaining the coordinate transformation.

$$a(i+\Delta b, j) = a(i, j) \quad (i \leq L/2)$$

$$a(i-\Delta b, j) = a(i, j) \quad (i \geq L/2) \tag{3}$$

Nextly, an image expansion ratio d(j) indicating to which degree picture element of j-th row is expanded is calculated. Assuming that the data on the document height in a picture element of j-th row, (j+1)-th is expressed as hj, h(j+1), respectively, the image expansion ratio $\alpha(j)$ is obtained from the following equation as apparent from FIG. 14:

$$\alpha(j) = \sqrt{1 + \left(\frac{h_{j+1} - h_j}{t}\right)^2} = \frac{AB}{AC} \tag{4}$$

Next, explanation is given to the rectification of uneven brightness (#25) with reference to FIG. 34(a). As shown in FIG. 34(a), the line data of the edge region E1 of the document and data of i-th picture element (i is several number) apart from the edge region E1 are read out as much as 1 line. E2 corresponds to position of the i-th picture element. Read out data of E2 are usable as a data on distribution of uneven brightness, since a region of E2 position contains no character in an ordinary document. FIG. 35 shows a brightness distribution curve in 1 line of the i-th picture element apart from the edge region. Assuming that line data is P(1), . . . P(j) consecutively from the 1st row, the image data carried out the uneven brightness rectification of image information data a(i, j) are derived from the following equation:

$$a(i, j) = \frac{\max}{P(j)} \cdot a(i, j) \tag{5}$$

max: maximum value of P(j)

Further, it may be possible to read out brightness distribution of the both edge regions of the document as in FIG. 34(b) and obtain the brightness distribution by means of average or weighted average method with use of two brightnesses, in place of reading the brightness distribution in the edge region of only one page of the spread out document.

Explanation is next given to Laplacian processing and $\gamma$ correction as a blur rectification (#26). Near a joint of the document, a defect of being out of focus is significant because the document inclines steeply therein and the difference in height of document surface becomes large. The Laplacian processing and $\gamma$ correction is performed to eliminate the defect.

Further, the image expansion processing (#27) based on the image expansion ratio $\alpha(j)$ is explained. The number of elements to be expanded for the picture element of j-th row, k, is obtained from the following equation:

$$k = \alpha(j) \cdot j - j - n \quad (6)$$

n: the number of expanded picture elements

Here, k is a value with its right side of the equation rounded off. For example, FIG. 36 shows the case the image data of 10th row is expanded by $\alpha$ (j)=1. 4 (j=1, ... 10).

when j=1, k=1. 4×1−1−0=0. 4=0 hence k=0, the number of expanded picture element is 0 (n=0)

when j=2, k=1. 4×2−2−0. 8=1 hence k=1, the number of expanded picture element is 1 (n=1)

when j=3 k=1. 4×3−3−1=0. 2=0 hence k=0, the number of expanded picture element is 0 (n=1)

Similarly, by calculating as for j=4, 5, ... 10, the result as shown in FIG. 37 can be obtained.

After the number of expanded picture elements is determined in this way, the density reproduction interpolation is carried out as an expansion processing. FIG. 38 shows the relation of the density and the expanded element when the element of j-th row is expanded into k. The density reproduction interpolation is expressed below:

when $k \geq 1$, $$a(i, j+1) = a(i, j) + (l/k) \cdot \{a(i, j+k) - a(i, j)\}(l=0, 1, \ldots k) \quad (7)$$

when k=0, $$a(i, j+1) = a(i, j) \quad (8)$$

The execution of each of foregoing processings enables the distortion rectification.

Next, an example of processor of distortion rectification is explained with reference to the block diagrams in FIGS. 39–42. A fine sensor is used as CCD. The output from CCD 121 is sampled and held in a sample hold circuit 122. The circumstantial brightness output from CCD 121 is removed by differential amplifying the output from the CCD 121 and the sample hold circuit 122 in a differential amplifier 123. The output from the differential amplifier 123 is subjected to A/D conversion by an A/D converter 124. By using a counter 127, the data on a factor of shading correction in main scanning direction of CCD 121 are sent to a multiplying circuit 125 from a ROM 126 to be multiplied with the output from the A/D converter 124. In this way, the shading correction is performed in main scanning direction of the CCD 121. The output from the multiplying circuit 125 is latched in a latch circuit 128. A ROM 129 converts the next data latched in the latch circuit 128 into a negative value. The output from the latch circuit 128 and the output from the ROM 129 are sent to an adding circuit 132 and added together.

The difference in level between white and black edge is calculated by inputting the output from the adding circuit 132 to a comparator 133. That is, the detection of the edge region shown in FIG. 24 is carried out here. The latch timing is controlled by the comparator 133 so that a value of a counter 138 may be latched in a latch circuit 137 when level difference between the white edge and black one exceeds a predetermined value. The latched value of the counter 138 becomes a value of $\Delta$ c. The data h on height of document surface is calculated by sending to an adding circuit 140 and adding the output from the latch circuit 137 and H/C data.

The output h1 from the adding circuit 140 is latched in a latch circuit 173. The h1 outputted from the adding circuit 140 is latched in a latch circuit 173. This h1 stands for the height of document surface at top edge shown in FIG. 26. The h2 stands for the height of document surface at bottom edge shown in FIG. 27. The h1 and h2 are entered into a comparator 175, and when the difference between h1 and h2 exceeds a predetermined value, a buzzer 174 or a LED lights for warning. The value of h1 and h2 are sent to the adding circuit 174 and added. By sending the output therefrom to a multiplying circuit 177 and multiplying by ½, the average of h1 and h2 is obtained. The average value h is regarded as a height of document (terminal A).

The output from the multiplying circuit 125 is entered into a shift register 130 for delaying the data. The output therefrom is converted into a reciprocal number by a ROM 134. The output therefrom being original data on the factor of shading correction in sub scanning direction, is sent to a multiplying circuit 136 to be multiplied by a predetermined value so as to be an adequate white fever after rectification. A latch circuit 139 latches the output From the multiplying circuit 136 in a timing corresponding to the edge of document. The output becomes a factor of shading correction in sub scanning direction of CCD.

The output from the multiplying circuit 125 is entered into a line buffer 131, and the output therefrom and the output from the latch circuit 139 are sent to a multiplying circuit 135 and multiplied. In this way, the shading correction is enabled in sub scanning direction of CCD (terminal B).

The data on the document surface height at terminal A is latched in a latch circuit 141, and data are next converted into a negative value by a ROM 142. The outputs from the latch circuit 141 and the ROM 142 are sent to a adding circuit 143 and added. This is equal to a value $h_{j+1} - h_j$ in the equation (4). The output from the circuit 143 is sent to a multiplying circuit 144, and $h_{j+1} - h_j$ is squared. The output from the circuit 144 and the squared value of line interval t are sent to an adding circuit 145 and added. The output therefrom is converted into a square root value by a ROM 150 and thereafter into an integer by an integer circuit 151. The ratio of image expansion $\alpha$ (j) in the equation (4) is calculated in this way (terminal C).

The data on the document height in the latch circuit 141 is sent to a multiplying circuit 146 and multiplied by the value of counter 149, namely, the value b. Further, the output from the circuit 146 is sent to a multiplying circuit 147 and multiplied with 1/H, and thus the value of (h/H).b−$\Delta$ b is calculated. This $\Delta$ b and the value b of the counter 149 are sent to an adding circuit 148, and the value of (b+$\Delta$ b) is calculated by adding both values. The value of (b+$\Delta$ b) is converted into an integer by integer circuit 152 and latched in latch circuit 153. The output from the latch circuit 153 and the next data of (b+$\Delta$ b) are sent to comparator 154 to be compared with each other. By controlling a write clock of a line buffer 155 corresponding to the output from the comparator 154, the output from CCD subjected to the shading correction from the terminal B is inputted to a line buffer 155, after being subjected to the coordinate transformation of the equation (3). The counter 156 controls a read clock of line buffer 155 and selector 157. The selector 157 selects so as to input white data into data removed by the line distortion rectification of the equation (3), and its output enters into a line buffer 158 (terminal D).

The output of 2 lines from the terminal D is entered into a line buffer 159, 160. With use of the data of 3 lines outputted from the terminal D, edge emphasizing is carried out by a 3×3 edge emphasizing filter 61, and $\gamma$ conversion is executed in a ROM 162 (terminal D).

The output α (j) from the terminal C is inputted into a microcomputer 163, which controls a selector 167. Upon receiving the output α (j) from the terminal E after γ correction, the microcomputer 163 controls a line buffer 164, 165, 166, ... so as to store the data of 1 line. The output from the line buffer, selected by the selector 167, is converted into a negative value in a ROM 169. The line buffer storing the data preceding by one is selected by the selector 167. The output from the selected line buffer and the ROM 169 are sent to an adding circuit 170 and added therein. Namely, the calculation of {a (i, j+k)–a(i, j)} of the equation (7) is carried out. The value of 1/k in the equation (7) is calculated by the microcomputer 163, and the resultant data and the output from the adding circuit 170 are sent to a multiplying circuit 171 and multiplied by each other. The output from the multiplying circuit 171 and the shift register 168 are sent to an adding circuit 172 and added. In this way, the processing of the equation (7) having been performed, the output subjected to a curvature rectification processing is obtained.

Figure 43:
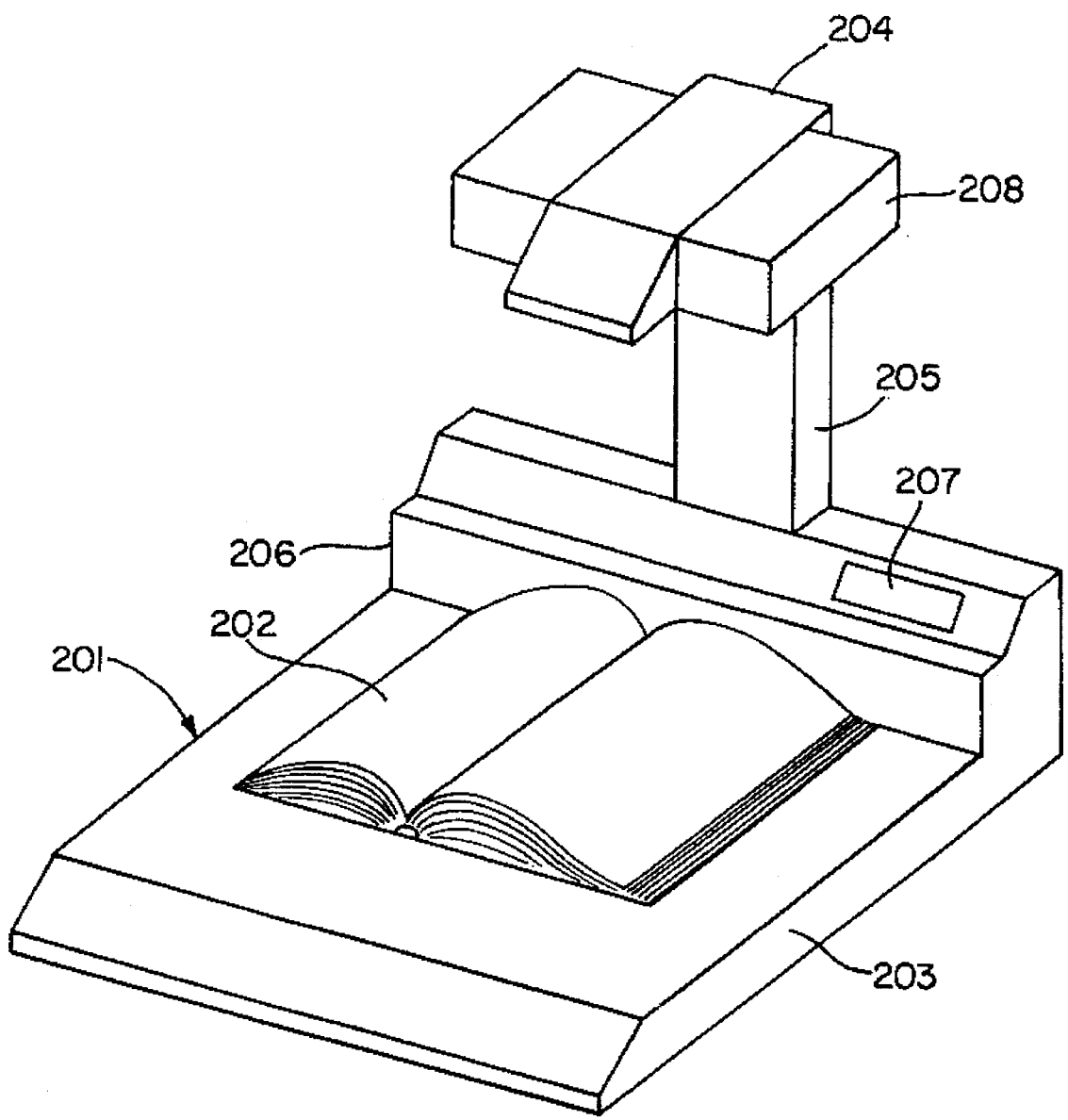
FIG. 43 is a perspective view showing an outward appearance of a document reading apparatus according to a third embodiment of the present invention.

FIG. 43 is a perspective side view showing an outside appearance of a document reading apparatus according to a third embodiment of the present invention. An apparatus 201 comprised of a document holder 203 on which a document 202 is placed, a reading section 204 and a supporting member 205 for supporting this reading section 204 in such a position that allows visual recognition of at least a readable area. A document stopper 206 for guiding a position wherein the document 202 to be placed and a group of operational switches 207 are provided on the document holder 203. Further, a plate for signal processing (not shown) is incorporated within the document holder 203. It is desirable to use a member whose light reflectance is different from that of the document 202 for the sake of rectifying processing to be described later: black or gray is suitable because of low reflectance. In the present described embodiment, the document stopper 206 is colored black. Also, an illuminating lamp 208 is attached to the reading section 204.

Figure 44:
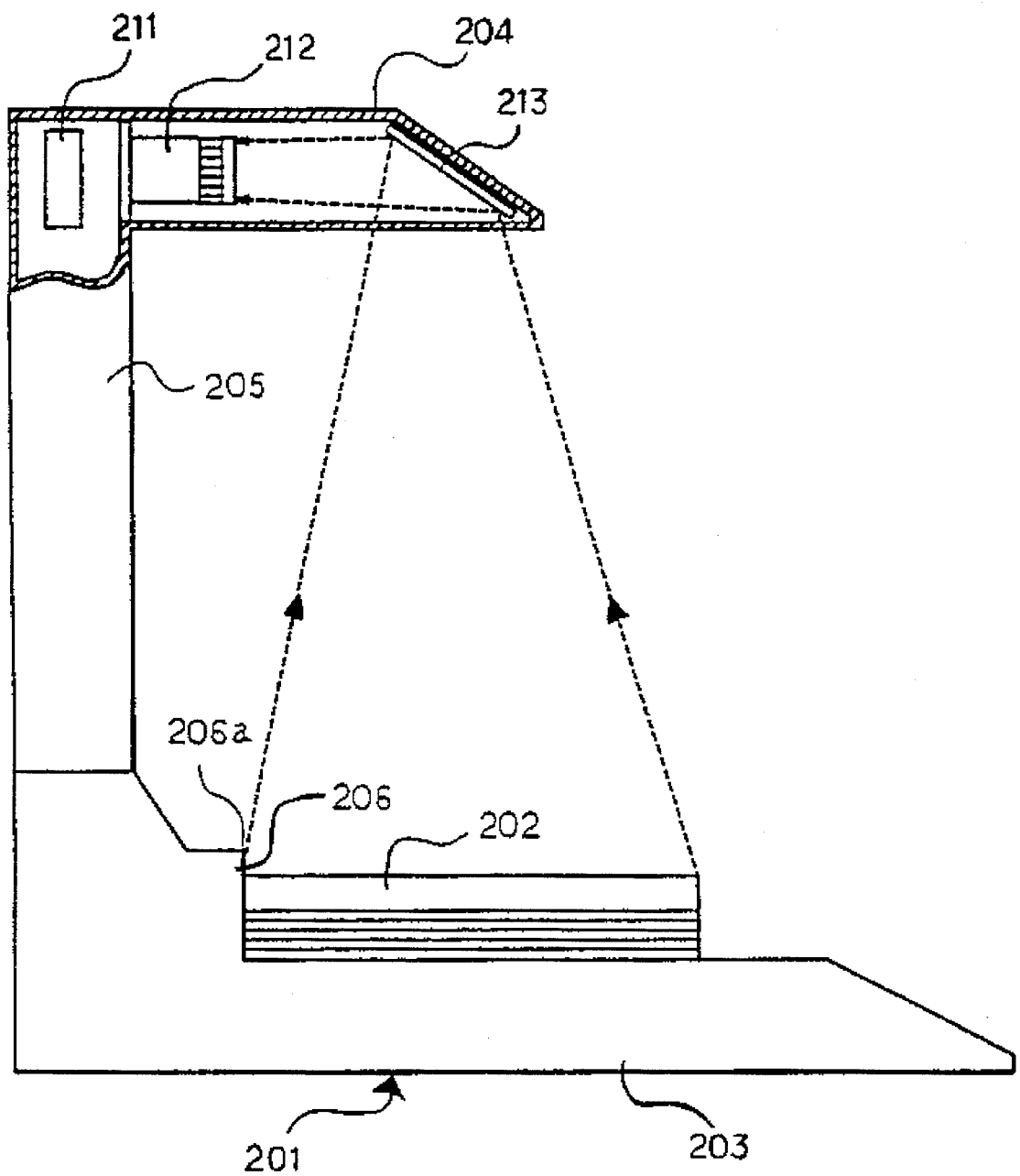
FIG. 44 is a side view of the document reading apparatus, partly in cross section, and partly schematic.

FIG. 44 is a side elevational view, partly in cross section, an partly schematic, of the document reading apparatus 1, showing internal construction of the reading section 204 and a transfer path of image data (dotted line) for explanation. Within the reading section 204, an image sensor 211 which is a line sensor (referred to as a line sensor hereinafter), an in-focus lens 212 which makes an image data enter into this line sensor and a reflection mirror 213 which makes an image on the document holder 203 reflect towards the line sensor are provided. As for the line sensor 211, a semiconductor photoelectric conversion element such as CCD is usable. It is also possible to construct it as an area sensor.

Figure 45:
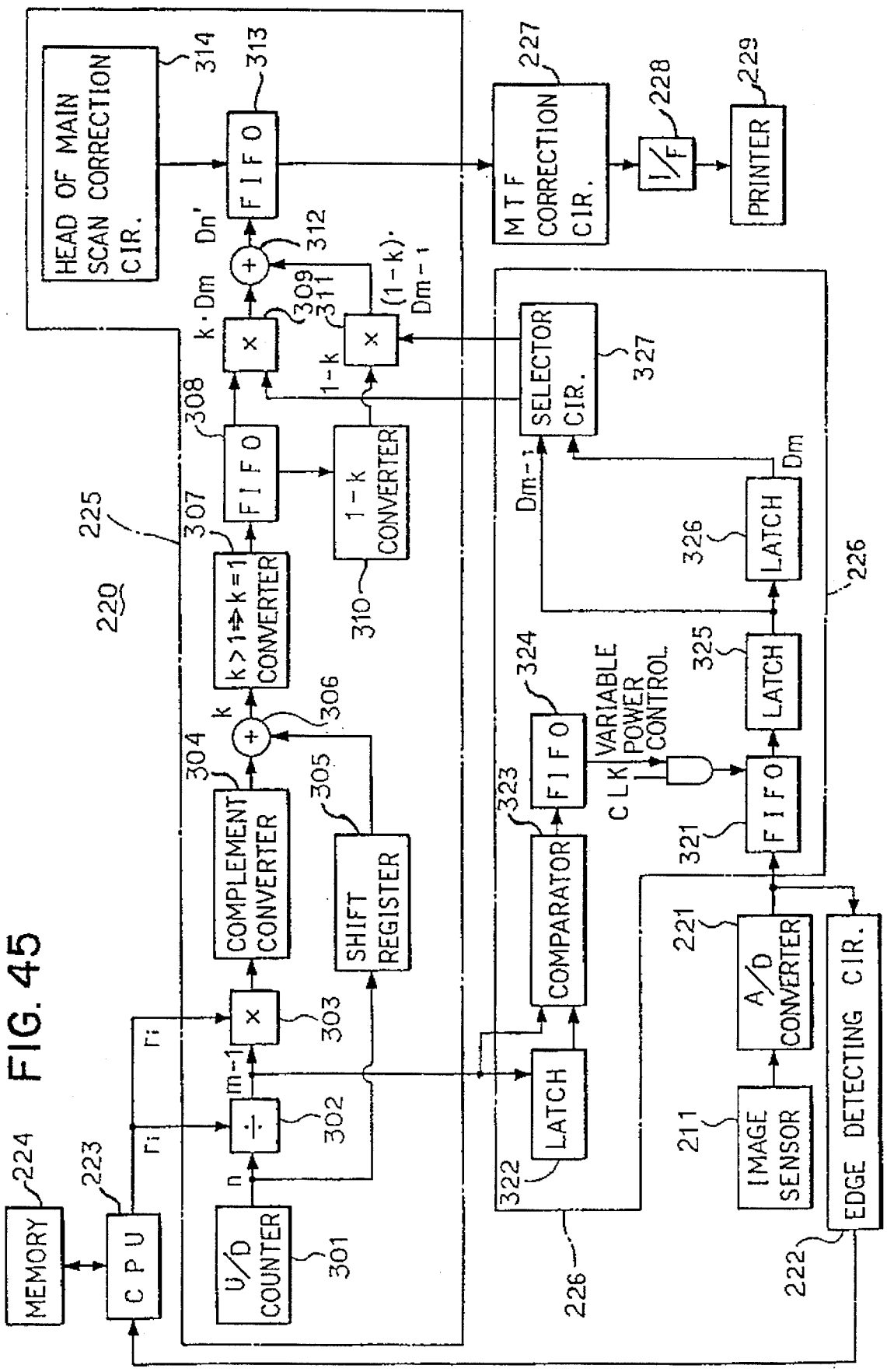
FIG. 45 is a block diagram showing a construction of the signal processing system of the document reading apparatus.

FIG. 45 is a block diagram showing a construction of signal processing system in the apparatus 201. The signal processing system 220 comprises a line distortion rectifying circuit 225 including an A/D converter 221 for converting data outputted From the line sensor 211 into a digital signal, an edge detecting circuit 222 for detecting an upper edge of an image of the document 202 in image data (referred as an edge hereinafter), CPU 223, memory 224, a divider 302, a multiplier 303 and the like, a varied magnification processing circuit 226 including FIFO 321 and a selector circuit 327, a MTF correction circuit 227 which corrects distortion due to optical characteristic, an interface (I/F) 228 for connecting with a printer 229.

Figure 46:
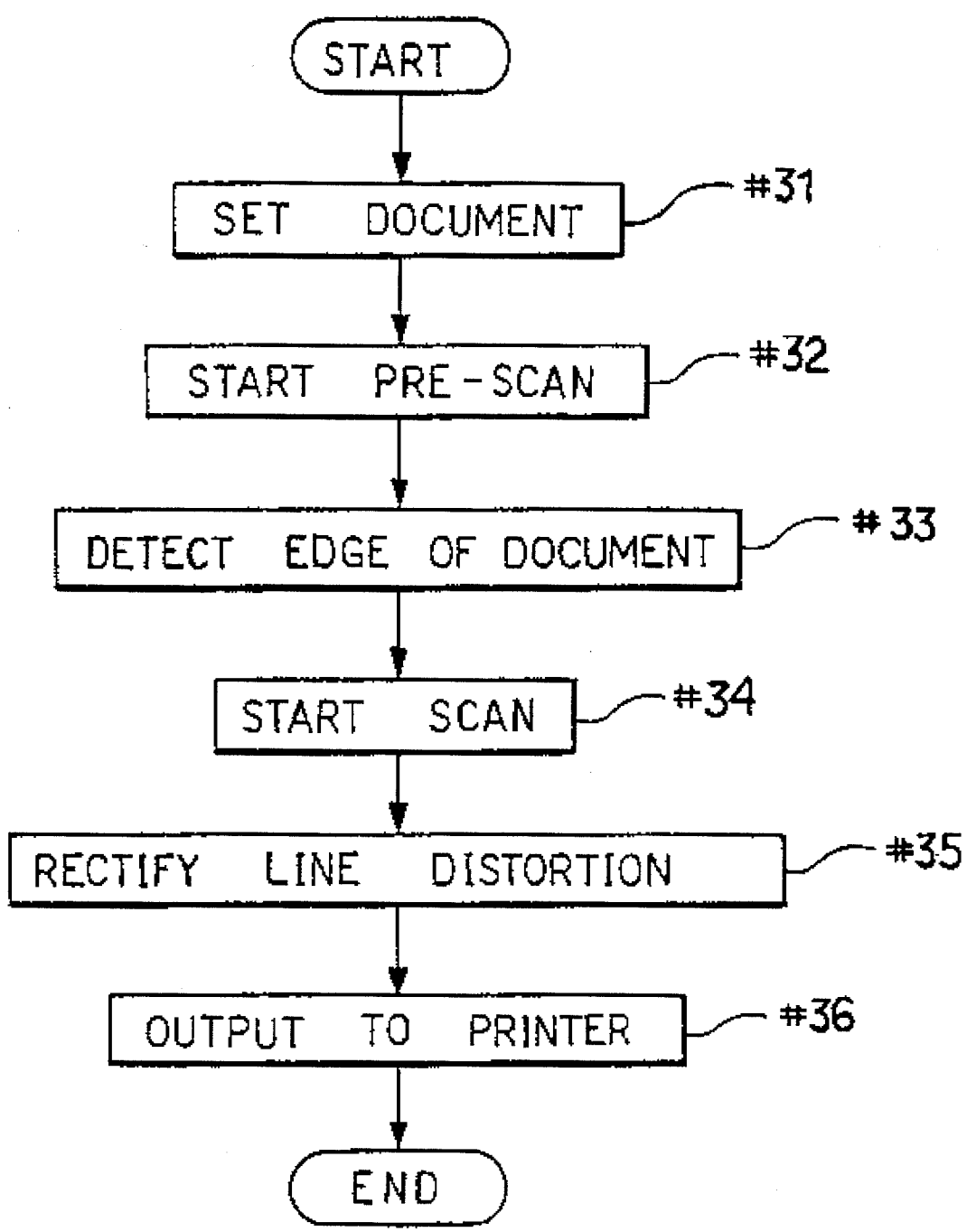
FIG. 46 is a flow chart showing a document reading operation of the document reading apparatus.
Figure 47:
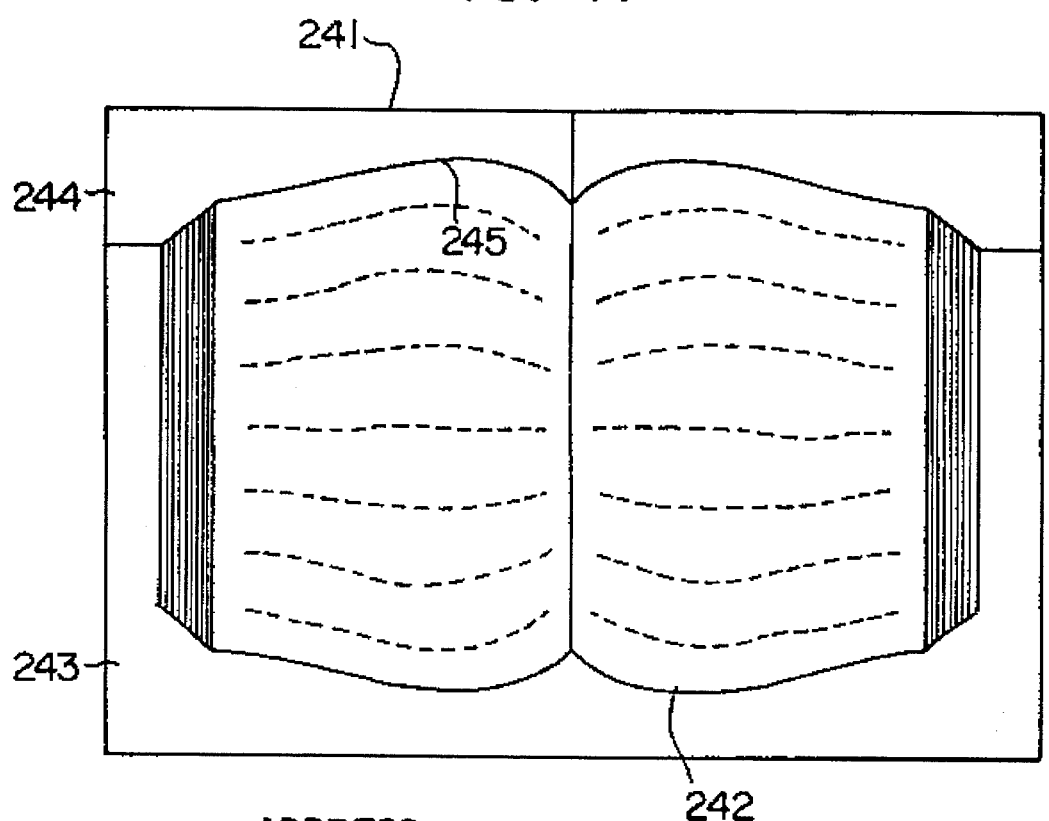
FIG. 47 is a view showing an image picked up at the time of pre-scanning of the document reading apparatus.
Figure 48:
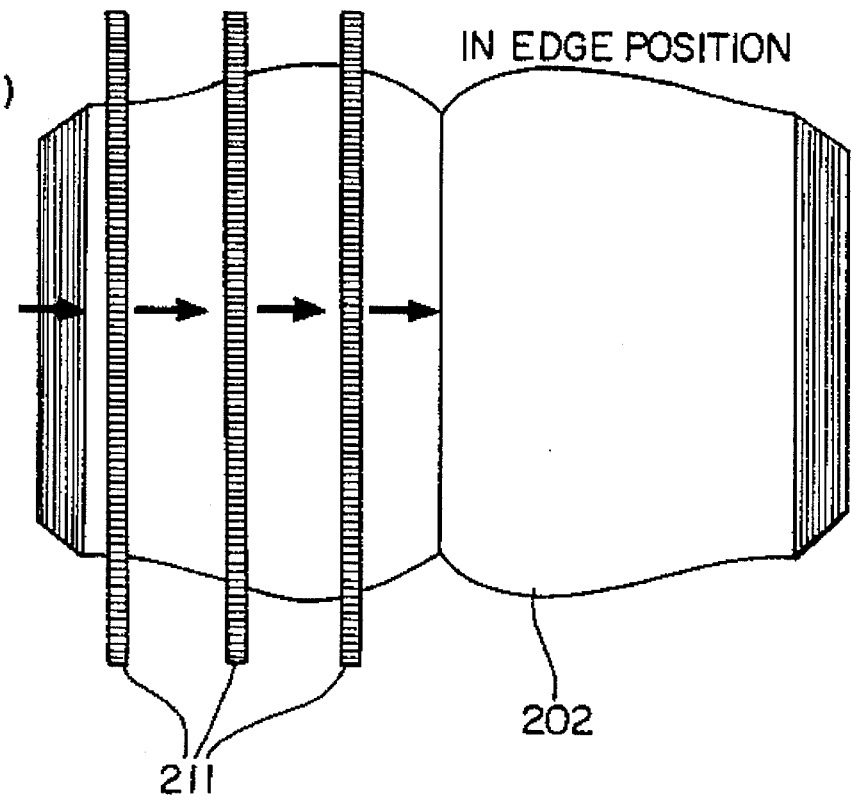
FIG. 48 is a view showing the action of line sensor at the time of pre-scanning of the document reading apparatus.

The document reading operation of the apparatus 201 according to the above construction is explained with reference to the flowchart in FIG. 46. Upon setting the document 202 on the document holder 203 (#31) and switching an imaging switch ON, pre-scanning is started by the line sensor 211 (#32). This pre-scan is performed so that an upper edge region 206a shown in FIG. 44 is included in an image pick up range. The image data read at the time of this pre-scan is shown in FIG. 47 as an example. In the same Figure, image data 241 include an image 242 of the document 202 which is placed with its pages opened, an image 243 of the document holder 203, an image 244 of the black document stopper 206. An edge 245 occurs between the document image 242 and the document stopper image 244. It is detected by the edge detecting circuit 222 which number of picture elements (address) corresponds to the position of this edge 245. While performing this edge detecting processing, by moving (sub scanning) the line sensor 211 over the document 202 as shown in FIG. 48, CPU 223 stores in memory 224 address data of the edge 245 in each line, which has been extracted with an adequate interval (#33).

The processing for detecting edge position having been completed, scanning is started to perform image pickup (#34). In this scanning, after converting the image data read in each line by the line sensor 211 into a digital signal by A/D converter 221, line distortion rectification is performed (#35).

Figure 49:
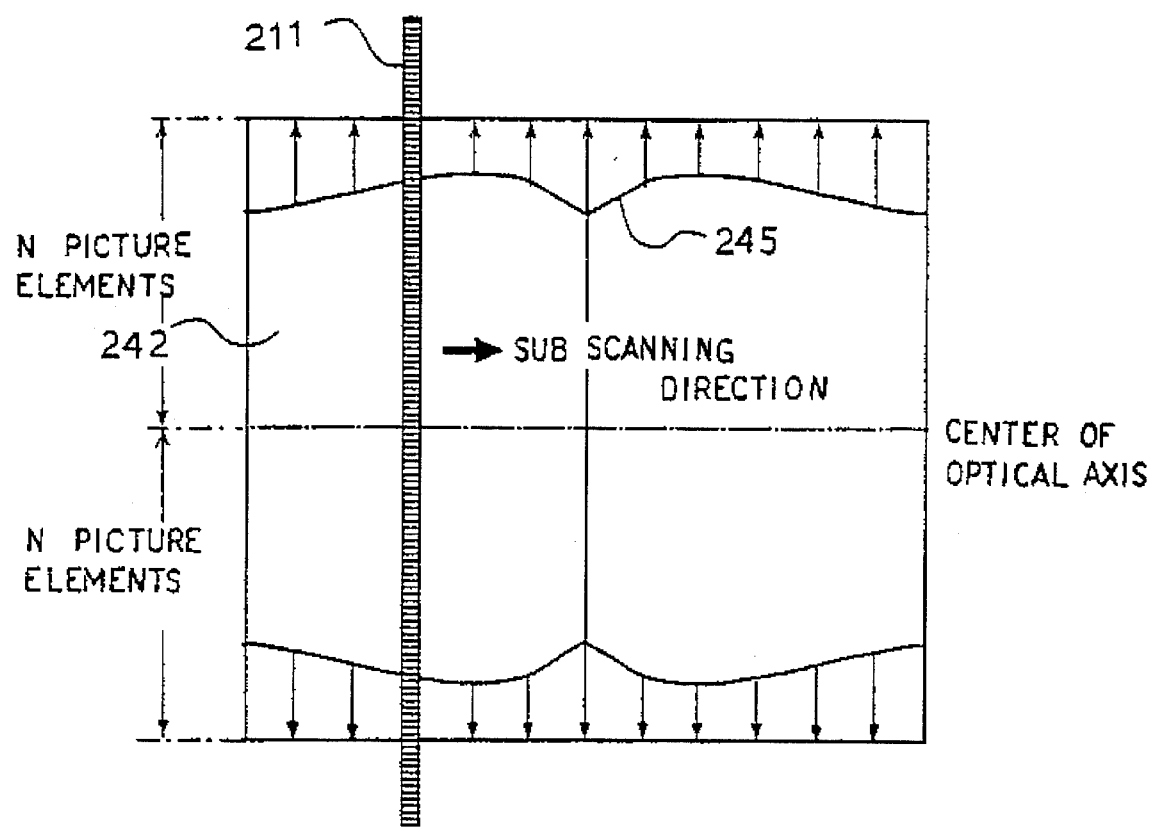
FIG. 49 is an explanatory view of a line distortion rectifying processing of the document reading apparatus.

Next explanation is given to the line distortion rectifying processing, with reference to FIG. 49. The line distortion rectifying performs varied magnification (expansional) processing with the image in the direction of longer side of the line sensor 211 from the center of the optical axis so that the magnification based on the center of the optical axis becomes equal in every line of the line sensor 211. In order to perform varied magnification processing, it is necessary to calculate a varied magnification with regard to each line. The value ri of varied magnification of i-th line is deprived from the equation below, with use of an address ai of edge position, which was detected and stored in memory at the time of above mentioned pre-scanning, and the number of picture elements N from the center of optical axis of the line sensor 211 at the time of scanning to the edge of image (head or end in main scanning direction):

$$ri = \frac{N}{N - ai} \quad (9)$$

ri: varied magnification at i-th line of linesensor ai: address of edge position at i-th line of linesensor N: the number of picture elements contained from the center of optical axis to the edge of image The CPU 223 performs the calculation of the above equation while scanning and sends an obtained varied magnification ri to the line distortion rectifying circuit 225.

Figure 50:
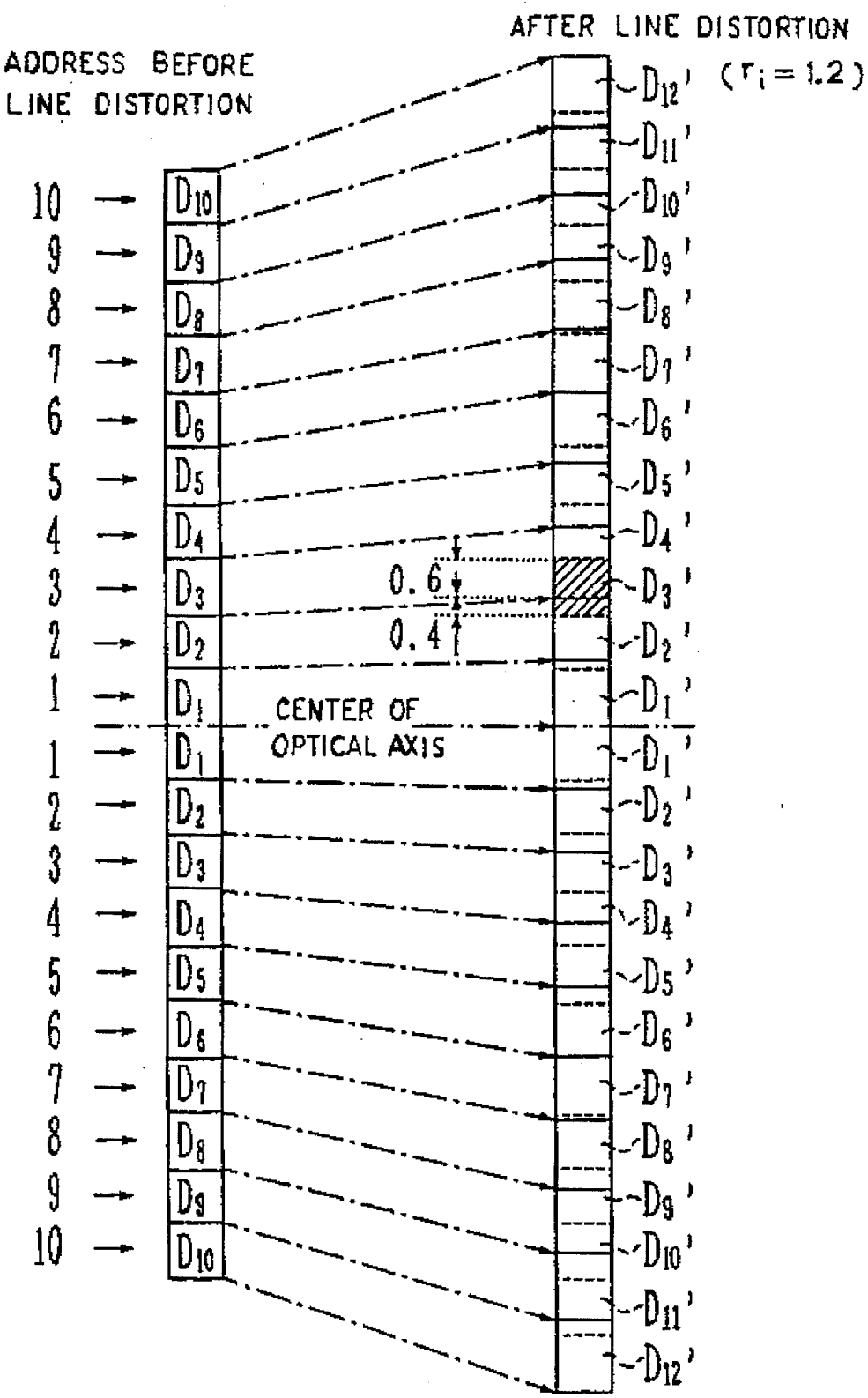
FIG. 50 shows an enlargement of picture elements around the center of an optical axis before a varied magnification processing and that of after a varied magnification processing.

An exemplary method of varied magnification processing of an image with use of varied magnification ratio ri is next explained with reference to FIG. 50. In FIG. 50, left side is a view showing an enlargement of the portion near the center of the optical axis of the line sensor 211. The address of the line sensor 211 increases from the center of optical axis towards both ends of the line sensor 211, as 1, 2 . . . . Right side is a view showing the state wherein the image data of the line sensor 211 is rectified at the varied magnification ri=1. 2. Here, although the size of a picture element after rectification becomes 1. 2 times larger than before rectification (shown with a solid line), the size of picture element is practically unchanged (shown with a dotted line). Therefore, the picture element after rectification contains a part of image data within 2 enlarged picture elements before rectification. For example, assuming that the size of picture element is 1, a picture element D3' after rectification shown with oblique line contains the data within enlarged picture element D2 before rectification in the amount of 0.4 and the data within enlarged picture element D3 in the amount of 0.6. The image data in picture element after rectification are determined by a ratio of 2 picture elements before rectification contained therein. This processing is expressed by the following equations:

$$Dn'=(1.0-k)D_{m-1}+k\cdot Dm \ (k\leq 1.0)$$
$$Dn'=Dm \ (k>1.0) \qquad (10)$$

n: address after rectification
Dn': image data after rectification
m: address before rectification
Dm: image data before rectification
k: distribution ratio of image data at address m for picture elements after rectification The relation between varied magnification ri, n, m and k is as following equation:

$$n \div ri = m-1 \ldots k \qquad (11)$$

Accordingly, when an address n after rectification is divided by varied magnification ri, the answer is m−1 with a remainder of k. If the address n after rectification and varied magnification ri are fixed, the data of picture element Dn' after rectification is obtainable from above equations (10) and (11). An example of above equation (11) is as follows:

$$
\begin{aligned}
1 \div 1.2 &= 0 & \ldots \ 1.0 \\
2 \div 1.2 &= 1 & \ldots \ 0.8 \\
3 \div 1.2 &= 2 & \ldots \ 0.6 \\
4 \div 1.2 &= 3 & \ldots \ 0.4 \\
5 \div 1.2 &= 4 & \ldots \ 0.2 \\
6 \div 1.2 &= 5 & \ldots \ 0.0 \\
7 \div 1.2 &= 5 & \ldots \ 1.0 \\
&\cdot \\
&\cdot \\
&\cdot \\
n \div ri &= m-1 & k
\end{aligned} \qquad (12)
$$

In the above, the picture element D3' after rectification shown in FIG. 50 with oblique line corresponds to the equation (12). In this case, since k≦1.0, the image data of picture element D3' becomes as follows in accordance with the aforementioned equation (9):

$$
\begin{aligned}
D3' &= (1.0-K)D_{m-1} + k \cdot Dm \\
&= (1.0-0.6)D2 + 0.6 \cdot D3 \\
&= 0.4 \cdot D2 + 0.6 \cdot D3
\end{aligned}
$$

The line distortion of image data is rectified, by performing the above calculation with regard to each element in the line distortion rectifying circuit 225 in FIG. 45.

The action of the line distortion rectifying circuit 225 is explained with reference to FIG. 45. When performing rectifying processing with i-th line of the line sensor 211, a varied magnification ri calculated in CPU 223 is inputted into a divider 302 and a multiplier 303. On the other hand, address n after rectification is generated by UP/DOWN counter 301, and address of 1 line: n, (n−1), . . . 1, 0, 0, 1, . . . , (N−1), N are inputted into the divider 302. In this way, the divider outputs m−1 which was obtained by dividing n by ri. Thereafter, −(m−1) is outputted by multiplying m−1 with varied magnification ri outputted from CPU 223 in the multiplier 303 and converting in a complement converting circuit 304. Further, the rectification address n is inputted into a shift register 305 so as to delay for a processing time period necessary for processing in the divider 302, multiplier 303 and complement converter 304. The output of the shift register 305 is added with the above −(m−1)ri by an adder 306. The remainder k is outputted from the adder 306 by calculating n−(m−1)ri.

In case the value of k which was outputted from the adder 306 exceeds 1, as being subjected to the same processing as in case k=1.0, k is converted into 1.0 at a converter 307. Also, as described later, the image data is outputted from a varied magnification processing circuit 226, being delayed as much as 1 line by FIFO 321. Hence, the output of k is also delayed by FIFO 308 for simultaneous output with this image data. Next, k×Dm is calculated by a multiplier 309, while k is converted into 1.0−k, and (1−k)×$D_{m-1}$ is calculated by a multiplier 311.

The above Dm, and $D_{m-1}$ are calculated by the sequence described hereinafter. The image data read by the line sensor 211 at the time of scanning are subjected to a signal conversion by an A/D converter 221 and inputted into a varied magnification processing circuit 226, and therein the image data are magnified at varied magnification by reading control in the FIFO 321. Namely, it is possible to perform calculations in accordance with the above (10) and (11) equations, if the data of corresponding picture elements before rectification are read out 2 times in succession, in case that the value of address (m−1) before rectification in the line sensor 211 becomes same in 2 picture elements adjacent each other. Therefore, the address (m−1) before rectification and an address before rectification delayed by one picture element by a latch 322 are compared with each other in a comparator 323, and in the case of both having same value, the same image data is read out 2 times successively in FIFO 324 used for simultaneous output. The value (image data) read out by the FIFO 321 is set as a value of $D_{m-1}$ in a latch 325 and as a value of Dm in a latch 326, selected optionally by a selector 327 and inputted respectively into the multiplier 309 and 311 in the line distortion rectifying circuit 225.

In succession, the above equation (10) is calculated by adding an output value k×Dm from the multiplier 309 and an output value (1−k)×$D_{m-1}$ from the multiplier 311. Thereafter, having rectified the difference in the head of 1 line of the line sensor 211 by FIFO 313 and by a head of main scanning correction circuit 314, the image with its line distortion rectified is outputted. The outputted line distortion rectification image is corrected at MTF correction circuit 227 and outputted into a printer 229 through an interface 228 (#36).

As explained hereinbefore, even in case of picking up an image of a curved document, it is possible to output a beautiful image with clear lines and characters by the following steps: detecting an edge position of the document; detecting a shape thereof; performing varied magnification processing; and rectifying image data as if the document surface to be read was flat. In the conventional apparatus, a jagged line often occurs in lines and characters contained in the image by a varied magnification processing, however, in the apparatus of the present described embodiment, the jagged line never occurs in lines or characters because the varied magnification processing is performed in each picture element.

The present invention is not restricted to the above described embodiments, but includes varied or modified embodiments from the above. For example, the construction of an apparatus can be varied in accordance with purpose of use or environment. Also, with respect to the edge detection performed at the time of pre-scanning, It may be possible to detect only an address of edge position of line sampled and held with an adequate interval and store its value without detection of edge address in every line. And then, when finding a varied magnification ri, by interpolating a sample address read out from the memory 224, the edge position of the line which was not detected at the time of pre-scanning is determined. In this way, the cost savings are realized by keeping the capacity of the memory 224 small, while reducing the time required for pre-scanning.

What is claimed is:

1. A document reading apparatus comprising:

document reading means for reading a document;

measuring means for measuring height of a predetermined number of points on the document;

interpolative means for interpolating height measurements from the points obtained from the measuring means; and rectifying means for rectifying an output from the document reading means in response to an output from the interpolative means.

2. The document reading means as claimed in claim 1, wherein the interpolative means performs 2-dimensional or 3-dimensional spline interpolation.

3. A document reading apparatus comprising:

document reading means for reading a document by creating an image to the document, the image comprising a plurality of picture elements;

shape detecting means for detecting a shape of the document from a predetermined number of measurements and producing an output in response;

calculation means for calculating and outputting an image expansion ratio for each picture element in response to an output from the shape detecting means; and expansion means for performing a density reproducing interpolation of each picture element and an image expansion in response to an output from the calculation means.

4. The document reading means as claimed in claim 3, wherein the shape detecting means includes means for detecting height of a predetermined number of points on the document.

5. The document reading means as claimed in claim 3, wherein the density reproducing interpolation provides density data for a given picture element by interpolating an average value of density data of picture elements before the given picture element and an average value of density data of picture elements following the given picture element.

6. The document reading apparatus as claimed in claim 3, wherein the shape detecting means detects a shape in a direction of height of document surface.

7. A document reading apparatus as claimed in claim 6, wherein the shape detecting means includes means for effecting spline interpolation based on the value obtained from the shape detecting means.

8. A document reading apparatus comprising:

document reading means for reading a document;

shape detecting means for detecting shape of the document based on a reading output from the document reading means;

line distortion rectifying means for rectifying distortion in a horizontal direction in an output from the document reading means;

blur rectifying means for rectifying blur in an output from the line distortion rectifying means; and expansion means for expansion processing of an output from the blur rectifying means.

9. A document reading apparatus comprising:

a document holder on which a document is placed;

reading means for reading the document on the document holder and outputting image data thereof;

boundary detecting means for detecting a boundary between an image of the document and that of the document holder in the image data outputted from the reading means;

varied magnification calculating means for calculating varied magnification based on detecting an output from the boundary detecting means; and rectifying means for performing a density reproducing interpolation on each image data and for rectifying distortion of the image of the document in the image data by varying magnification of a part of the image as calculated by the varied magnification calculating means.

10. A document reading apparatus comprising:

document reading means for reading a document and outputting an image comprised of a plurality of picture elements;

measuring means for measuring height of a predetermined number of points on the document;

calculation means for calculating an image expansion ratio for each picture element in response to an output from the measuring means; and expansion means for performing density reproducing interpolation of each picture element and image expansion in response to an output from the calculation means.

11. The document reading apparatus as claimed in claim 10, wherein the measuring means measures the height at 10 points on the document.

12. A document reading apparatus comprising:

document means for reading a document and creating an output representative of the document;

measuring means for measuring height of a predetermined number of points on the document;

line distortion rectifying means for using the measurements of the measurement means for rectifying distortion in a horizontal direction of the output from the document reading means and producing a rectified output;

blur rectifying means for rectifying blur in the output from the line distortion rectifying means and producing a blur corrected output; and expansion means for expanding the output of the blur rectifying means and producing an output of the expansion.

13. A document reading apparatus comprising:

document reading means for reading a document and outputting an image comprised of a plurality of picture elements;

measuring means for measuring height at a predetermined number of points on the document;

interpolation means for creating and outputting a representation of a surface shape of the document from the measured heights;

calculation means for calculating an image expansion ratio for each picture element in response to an output from the interpolation means; and expansion means for performing density reproducing interpolation of each picture element and image expansion in response to an output from the calculation means.

14. A document reading apparatus comprising:

document means for reading a document and creating an output representative of the document;

measuring means for measuring a height of a predetermined number of points on a surface of the document;

interpolation means for creating and outputting a representation of a surface shape of the document from the measured heights;

line distortion rectifying means for using an output of the interpolation means for rectifying distortion in a horizontal direction of the output from the document reading means and producing a rectified output;

blur rectifying means for rectifying blur in the output from the line distortion rectifying means and producing a blur corrected output; and expansion means for expanding the output of the blur rectifying means and producing an expansion output.

15. A document reading apparatus comprising:

document means for reading a document and creating an output representative of the document;

measuring means for measuring a height of a predetermined number of points on a surface of the document;

spline interpolation means for creating and outputting a representation of a surface shape of the document from the measured heights;

line distortion rectifying means for using an output of the interpolation means for rectifying distortion caused by slanting of the document in a horizontal direction of the output from the document reading means and producing a distortion-rectified output;

nonlinear brightness correcting means for correcting nonlinear brightness in the rectified output caused by slanting of the document and producing a brightness-corrected rectified output;

blur rectifying means for rectifying blur in the brightness-corrected distortion-rectified output and producing a blur-rectified, brightness-corrected, distortion-rectified output; and expansion means for expanding the output of the blur rectifying means and thereby producing a final corrected output for printout.

16. The apparatus of claim 15, wherein the nonlinear brightness correcting means uses the brightness data of a print-free edge of the document as a basis for nonlinear brightness correction.

* * * * *